United States Patent
Akita et al.

(10) Patent No.: US 12,471,066 B2
(45) Date of Patent: Nov. 11, 2025

(54) ELECTRONIC APPARATUS, BASE STATION, COMMUNICATION SYSTEM, METHOD, AND STORAGE MEDIUM

(71) Applicant: KABUSHIKI KAISHA TOSHIBA, Tokyo (JP)

(72) Inventors: Koji Akita, Yokohama Kanagawa (JP); Yuki Yonezawa, Ayase Kanagawa (JP); Tomoya Tandai, Tokyo (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 409 days.

(21) Appl. No.: 18/177,656

(22) Filed: Mar. 2, 2023

(65) Prior Publication Data
US 2024/0098702 A1    Mar. 21, 2024

(30) Foreign Application Priority Data

Sep. 15, 2022  (JP) ................................. 2022-147240

(51) Int. Cl.
 *H04W 72/02*  (2009.01)
 *H04W 72/0446*  (2023.01)
 *H04W 72/20*  (2023.01)

(52) U.S. Cl.
CPC ....... *H04W 72/02* (2013.01); *H04W 72/0446* (2013.01); *H04W 72/20* (2023.01)

(58) Field of Classification Search
CPC .. H04W 72/20; H04W 72/02; H04W 72/0446
See application file for complete search history.

(56) References Cited

U.S. PATENT DOCUMENTS

| 9,258,778 B2 * | 2/2016 | Takashima | ........ H04W 52/0206 |
| 11,197,337 B2 * | 12/2021 | Choi | ...................... H04W 76/11 |
| 11,218,991 B2 * | 1/2022 | Liu | ........................ H04L 5/0053 |

(Continued)

FOREIGN PATENT DOCUMENTS

| JP | 2017143525 A | 8/2017 |
| JP | 2018133663 A | 8/2018 |

(Continued)

OTHER PUBLICATIONS

Chaudhary, et al., "C-RAN Employing xRAN Functional Split: Complexity Analysis for 5G NR Remote Radio Unit", Fig. 1., xRAN functional split 7.2 showing full processing chain, 2019, https://www.researchgate.net/figure/xRAN-functional-split-72-showing-full-processing-chain_fig1_332780667.

(Continued)

*Primary Examiner* — Raj Jain
(74) *Attorney, Agent, or Firm* — Holtz, Holtz & Volek PC

(57) ABSTRACT

According to one embodiment, an electronic apparatus is arranged at an interface between a first layer and a second layer in a base station, and includes a processor and a memory configured to store allocation information indicating a radio resource for a first control signal. The first layer is configured to transmit a physical layer signal to the second layer. The processor is configured to generate a second control signal based on the allocation information, generate a synthesis signal by adding the second control signal to the physical layer signal, and transmit the synthesis signal to the second layer.

21 Claims, 19 Drawing Sheets

(56) References Cited

U.S. PATENT DOCUMENTS

| | | | |
|---|---|---|---|
| 2005/0277411 A1* | 12/2005 | Utsunomiya | H04W 24/00 |
| | | | 455/434 |
| 2011/0019604 A1* | 1/2011 | Chun | H04W 72/535 |
| | | | 370/312 |
| 2015/0117342 A1 | 4/2015 | Loehr et al. | |
| 2019/0104537 A1 | 4/2019 | Yasukawa et al. | |
| 2019/0334672 A1* | 10/2019 | Byun | H04L 27/261 |
| 2023/0199769 A1 | 6/2023 | Yonezawa et al. | |
| 2024/0098702 A1* | 3/2024 | Akita | H04W 72/0446 |

FOREIGN PATENT DOCUMENTS

| | | | |
|---|---|---|---|
| JP | 2023091725 A | 6/2023 | |
| WO | 2017170118 A1 | 10/2017 | |

OTHER PUBLICATIONS

Lichtman, et al., "Detection and Mitigation of Uplink Control Channel Jamming in LTE", Figure 1, 2014 IEEE Military Communications Conference, 2014, pp. 1187-1194, DOI: 10.1109/MILCOM.2014.199, https://www.semanticscholar.org/paper/Detection-and-Mitigation-of-Uplink-Control-Channel-Lichtman-Czauski/97f0c3cf16fa4d213a7d30e90a46de03d2d27ce1.

* cited by examiner

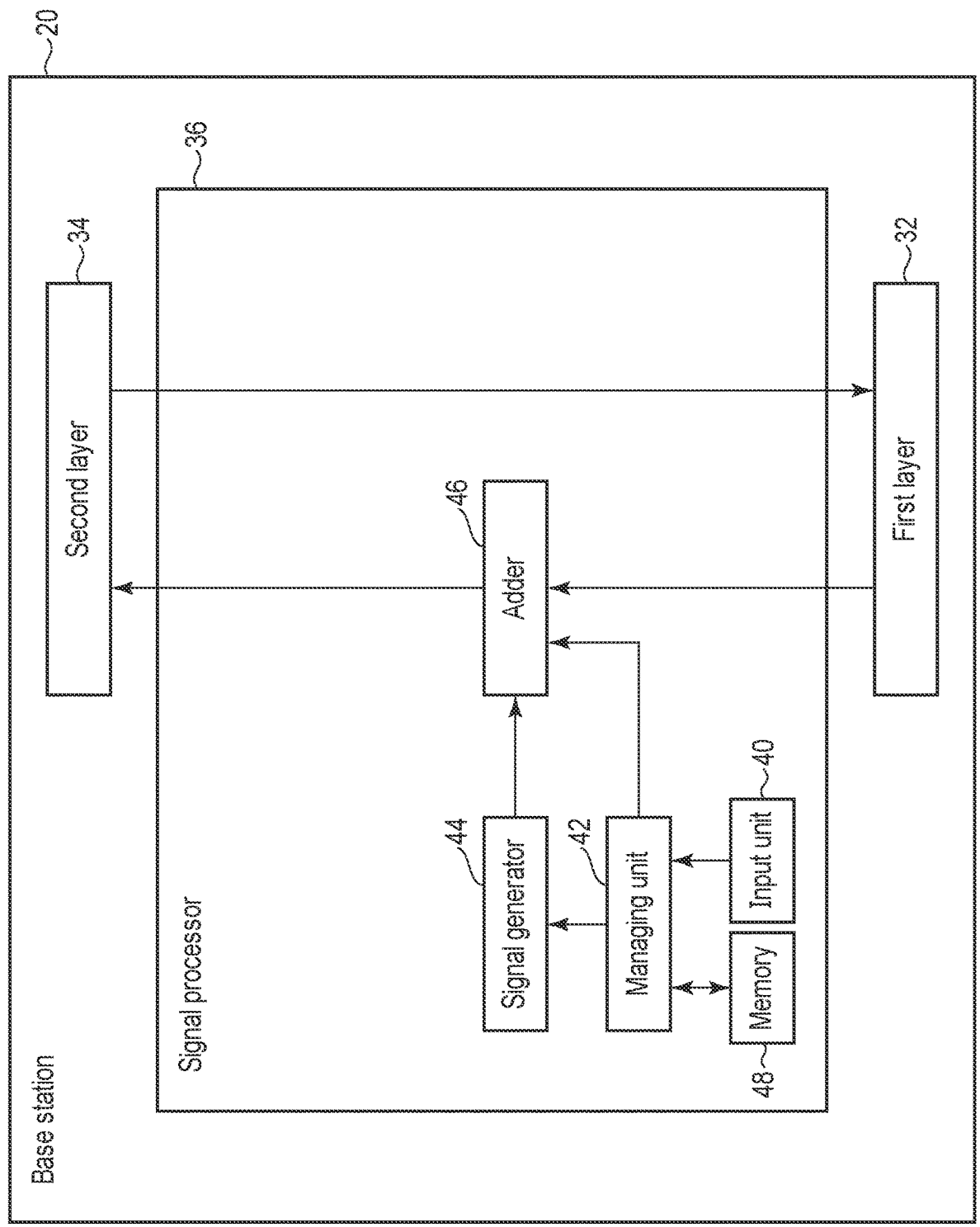
F I G. 2

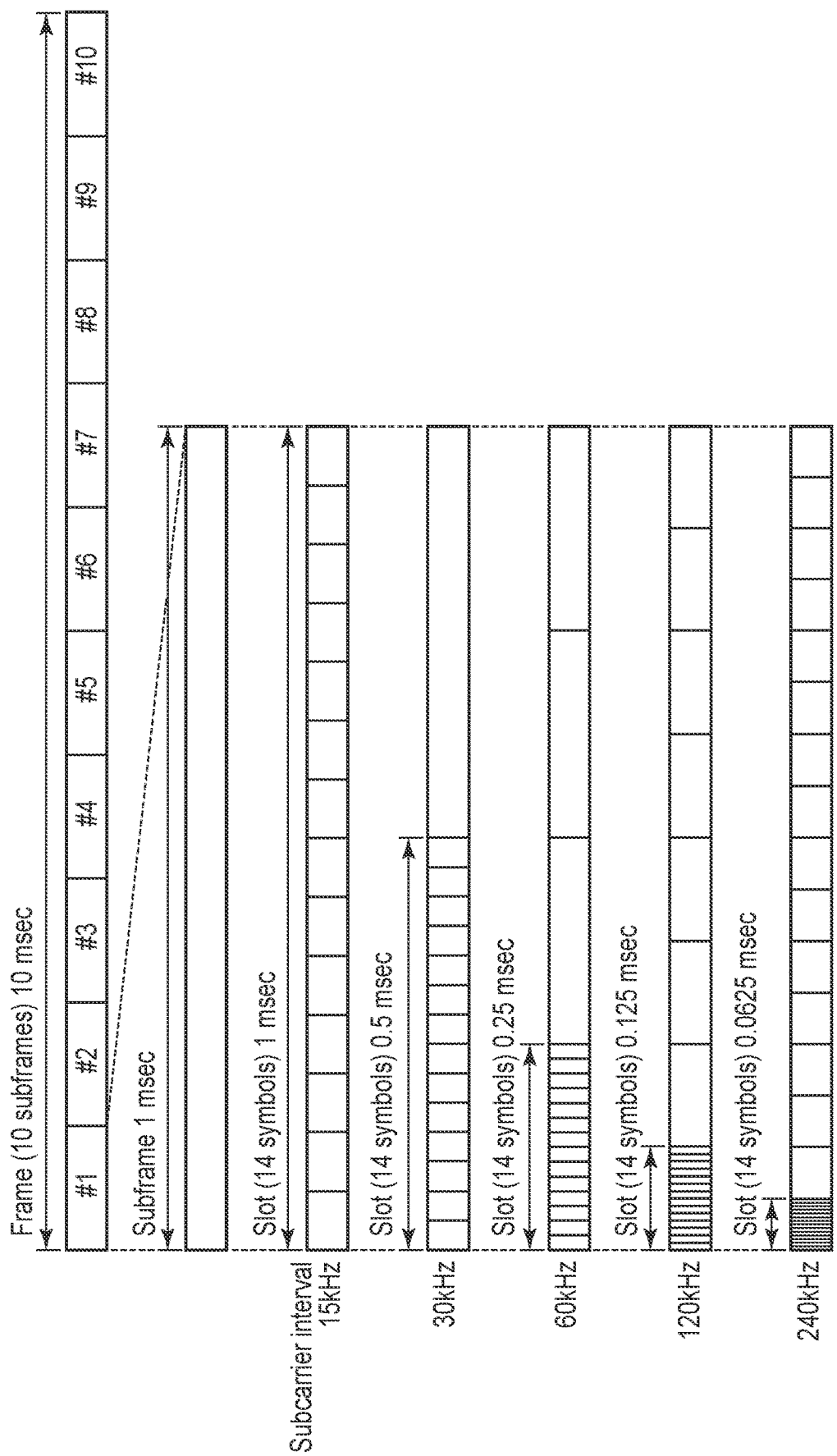
F I G. 6

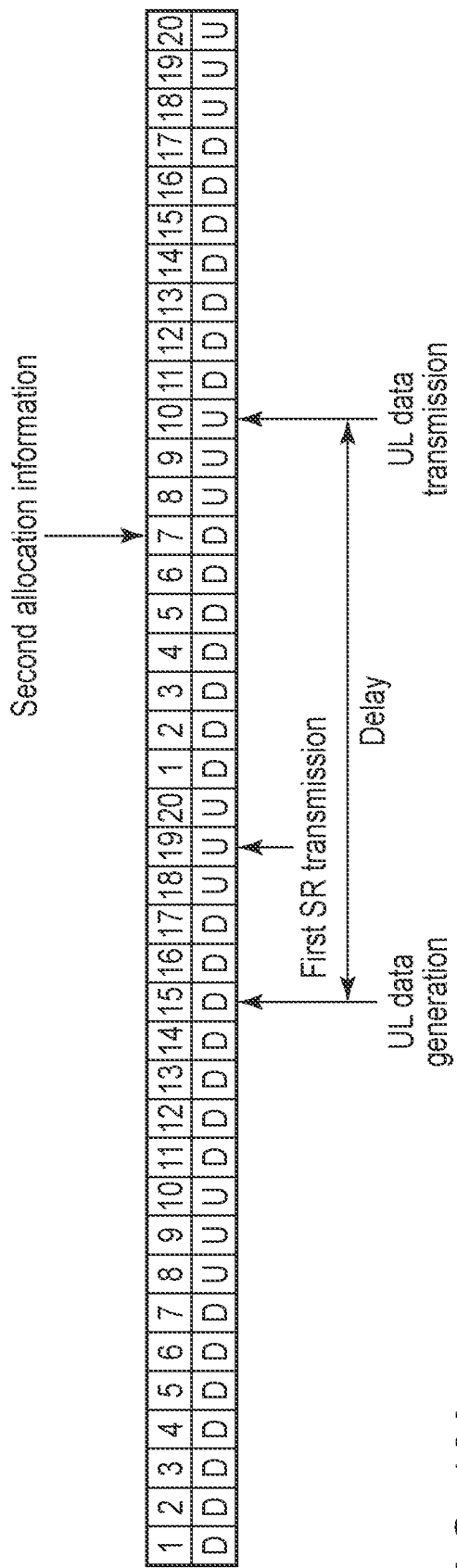
F I G. 10A
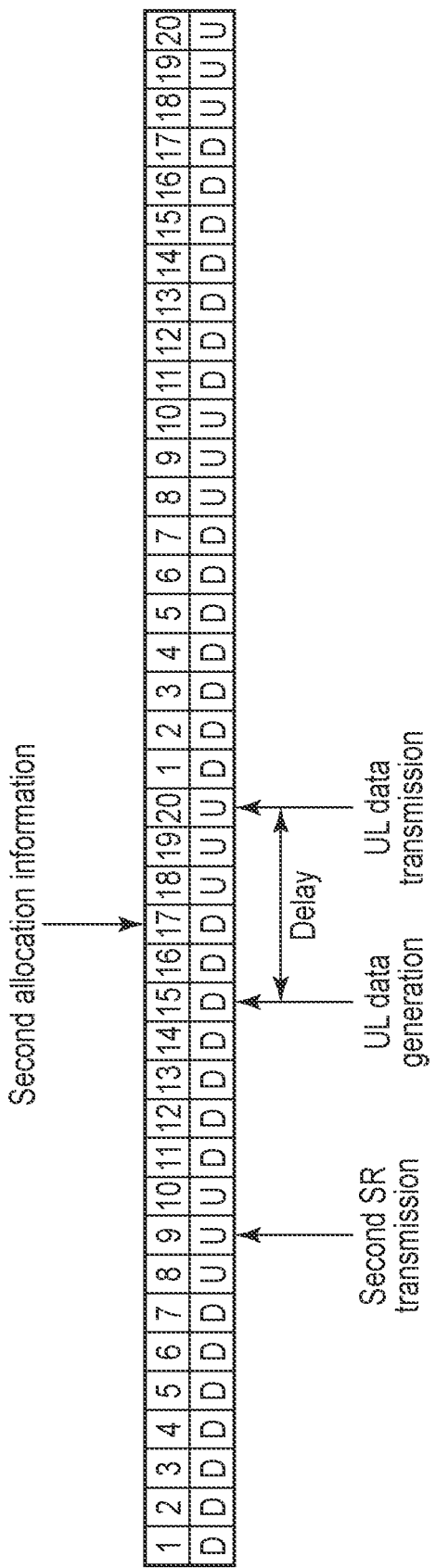
F I G. 10B

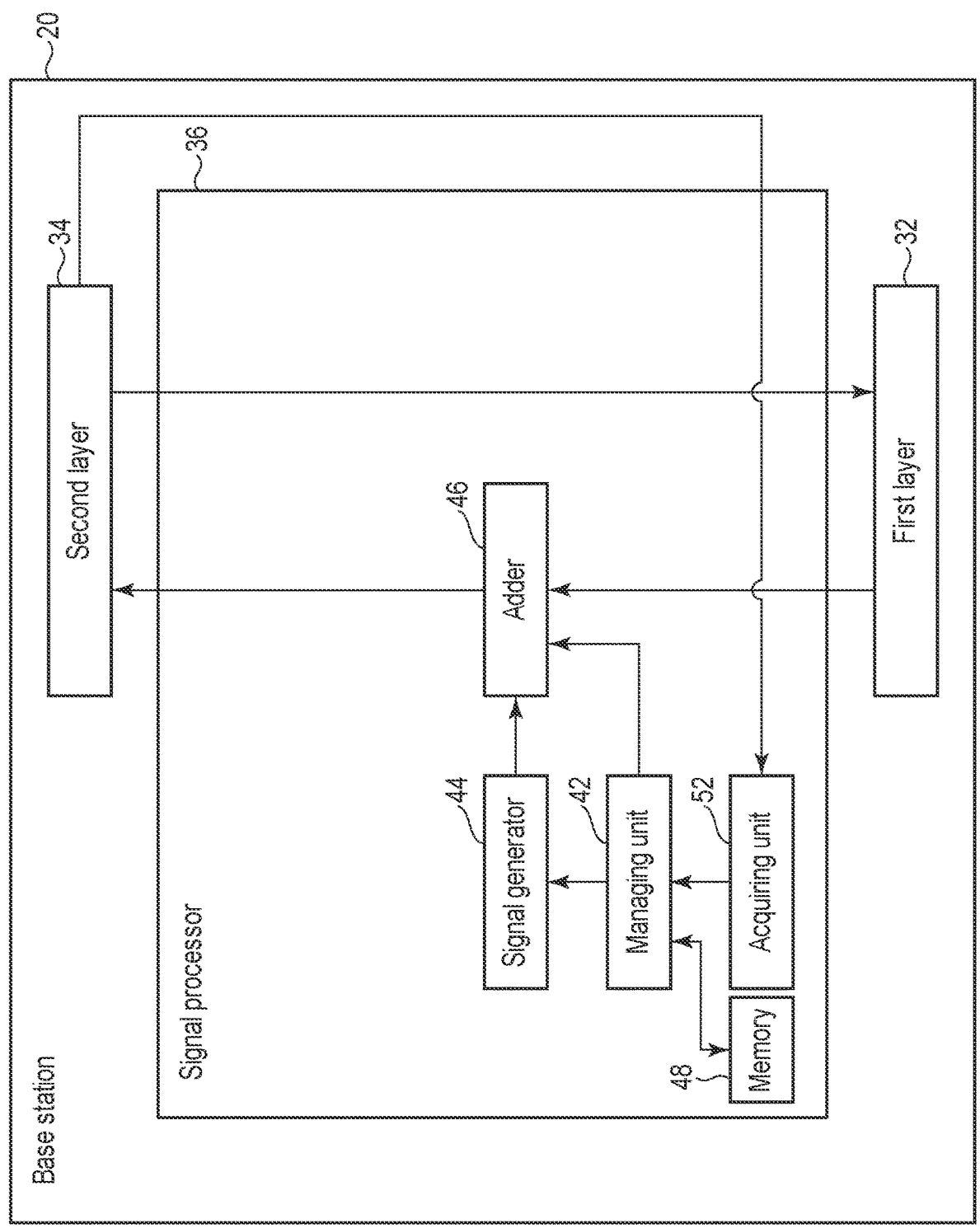
F I G. 12

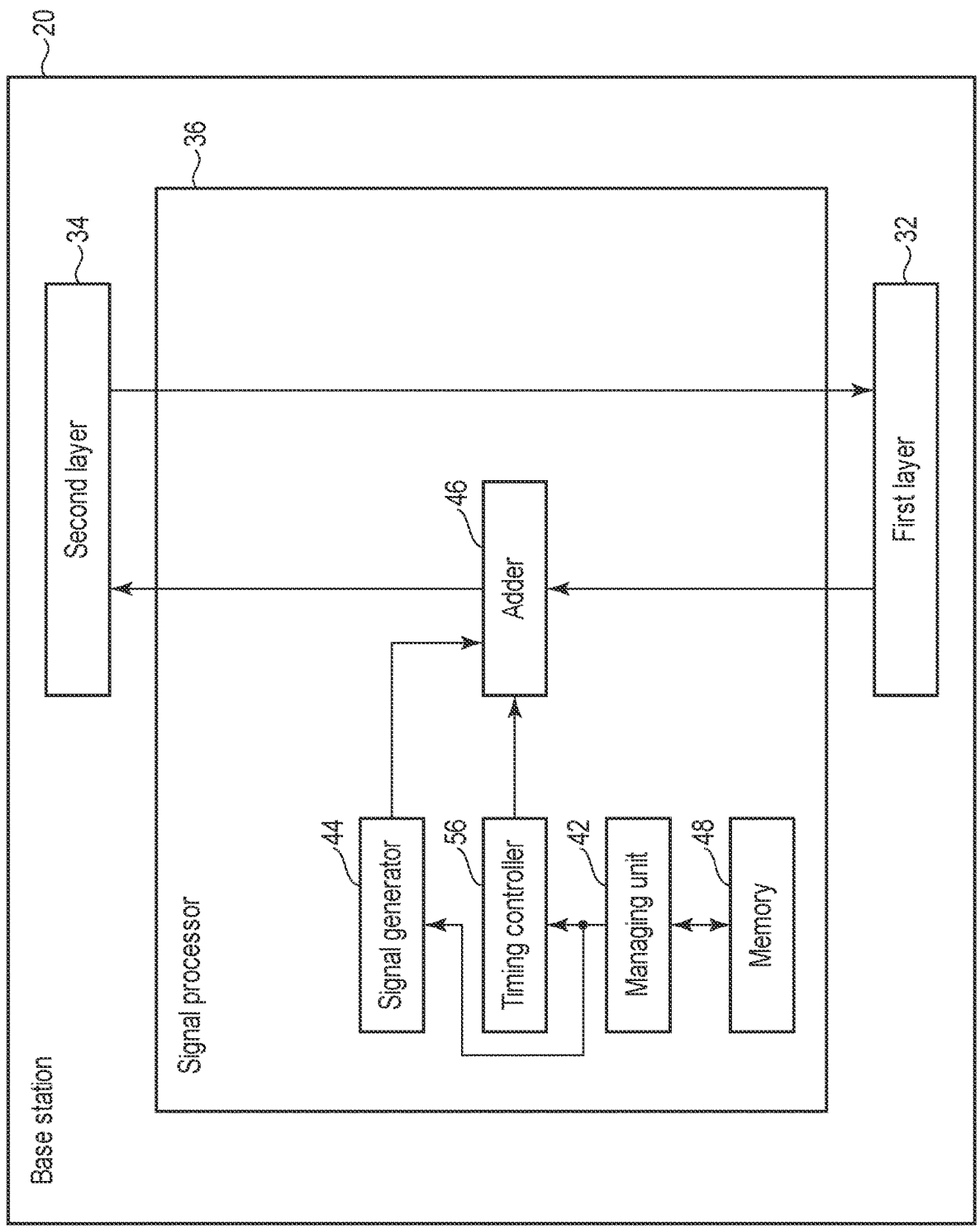
F I G. 13

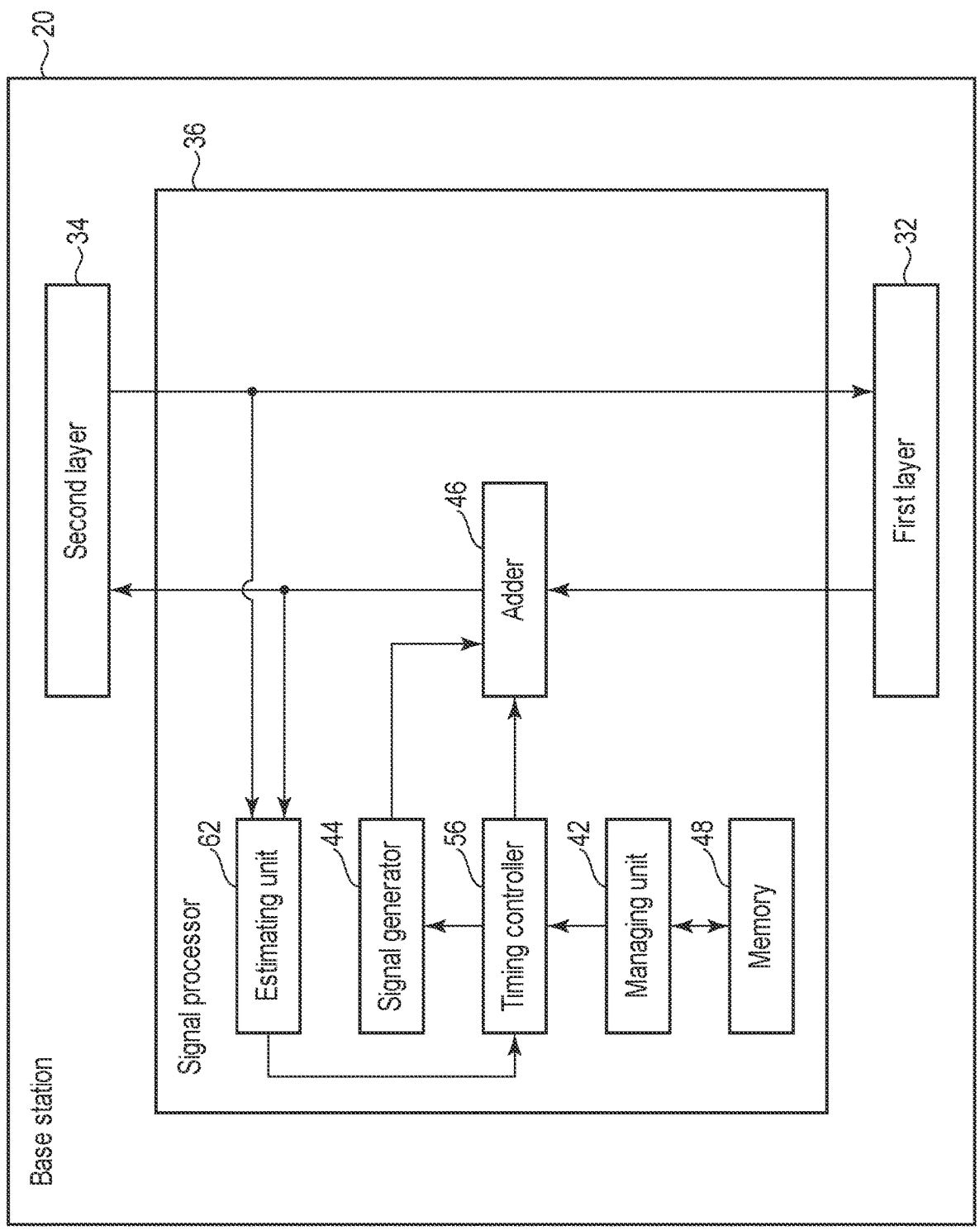
F I G. 15

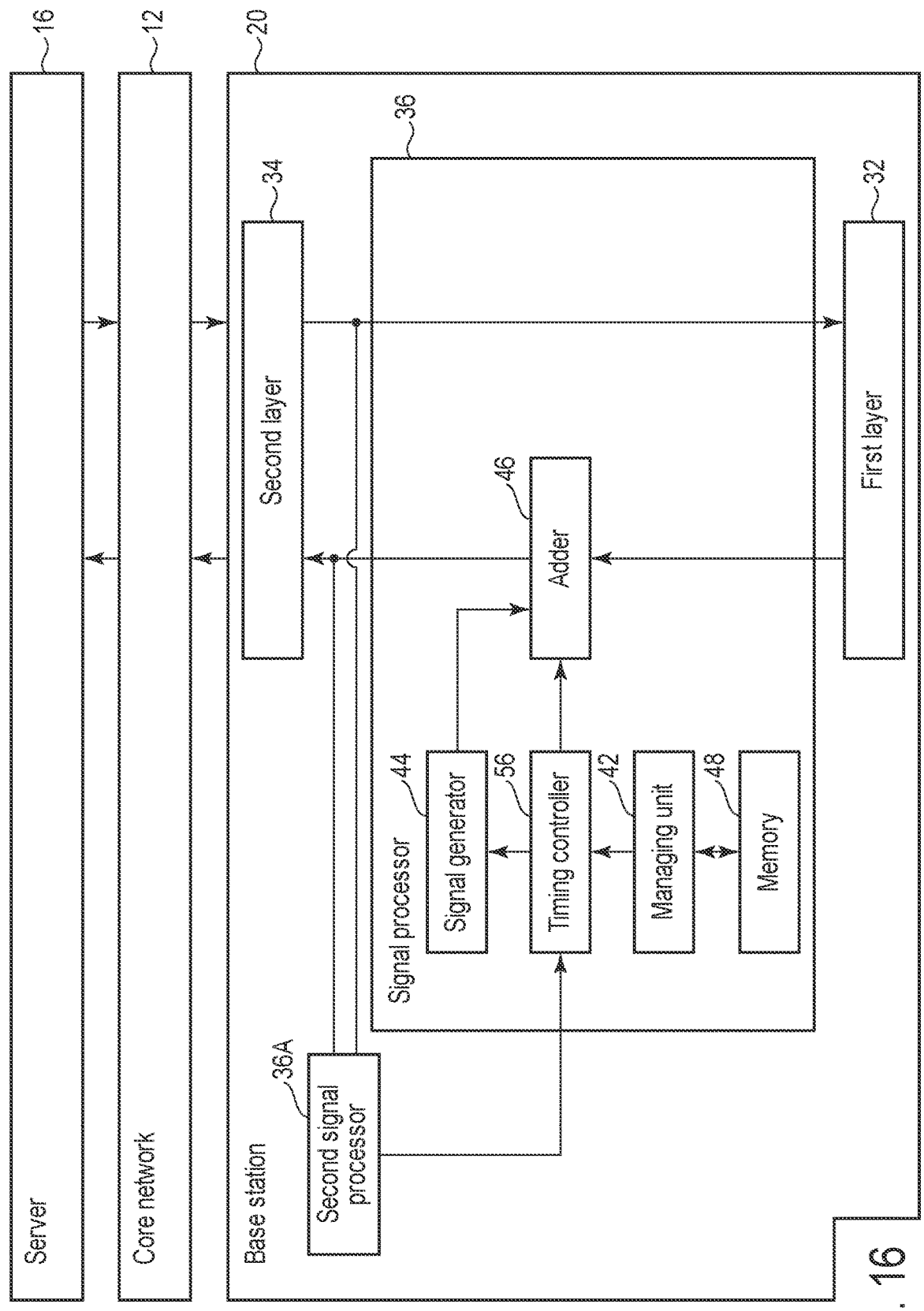
F I G. 16

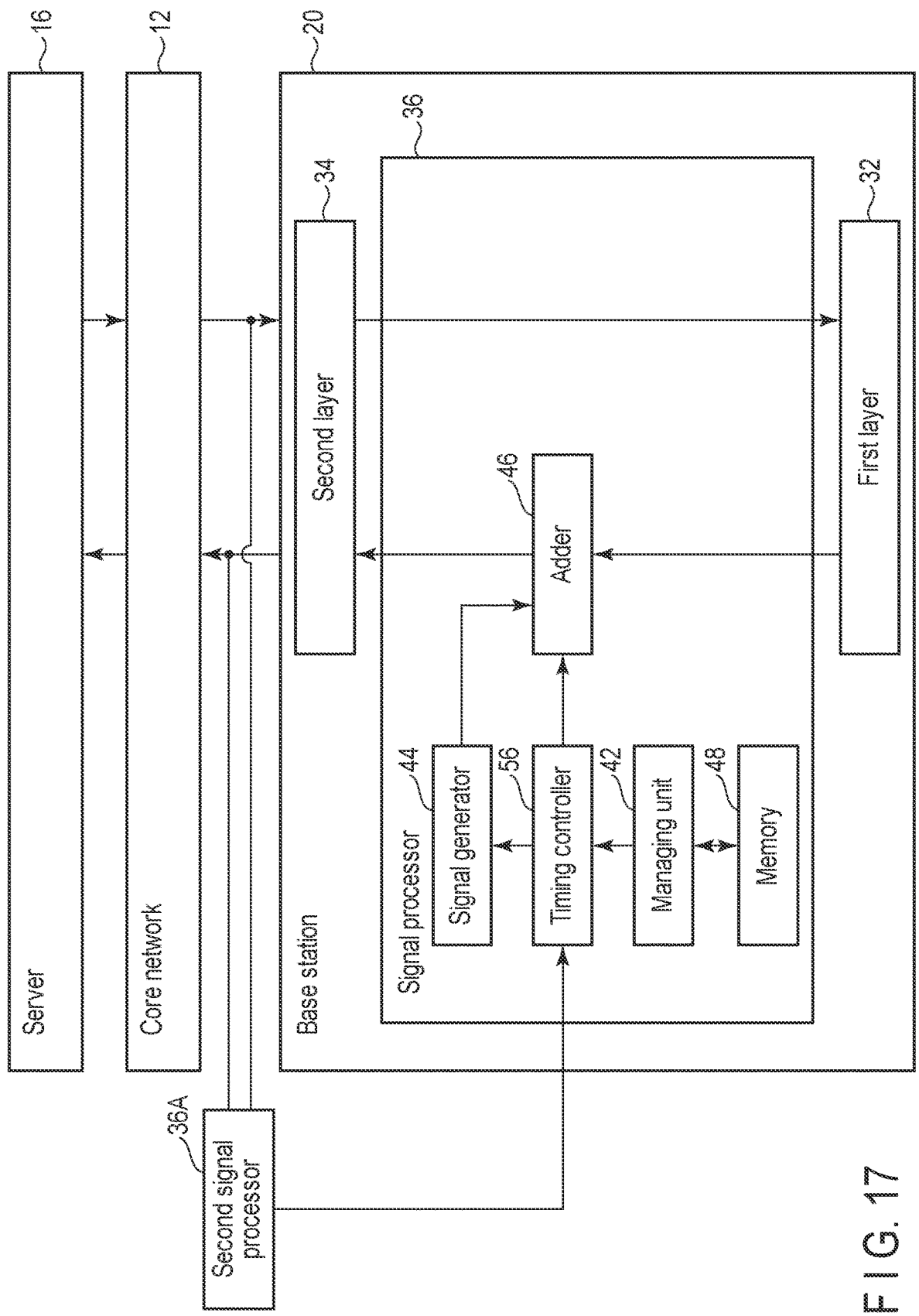
F I G. 17

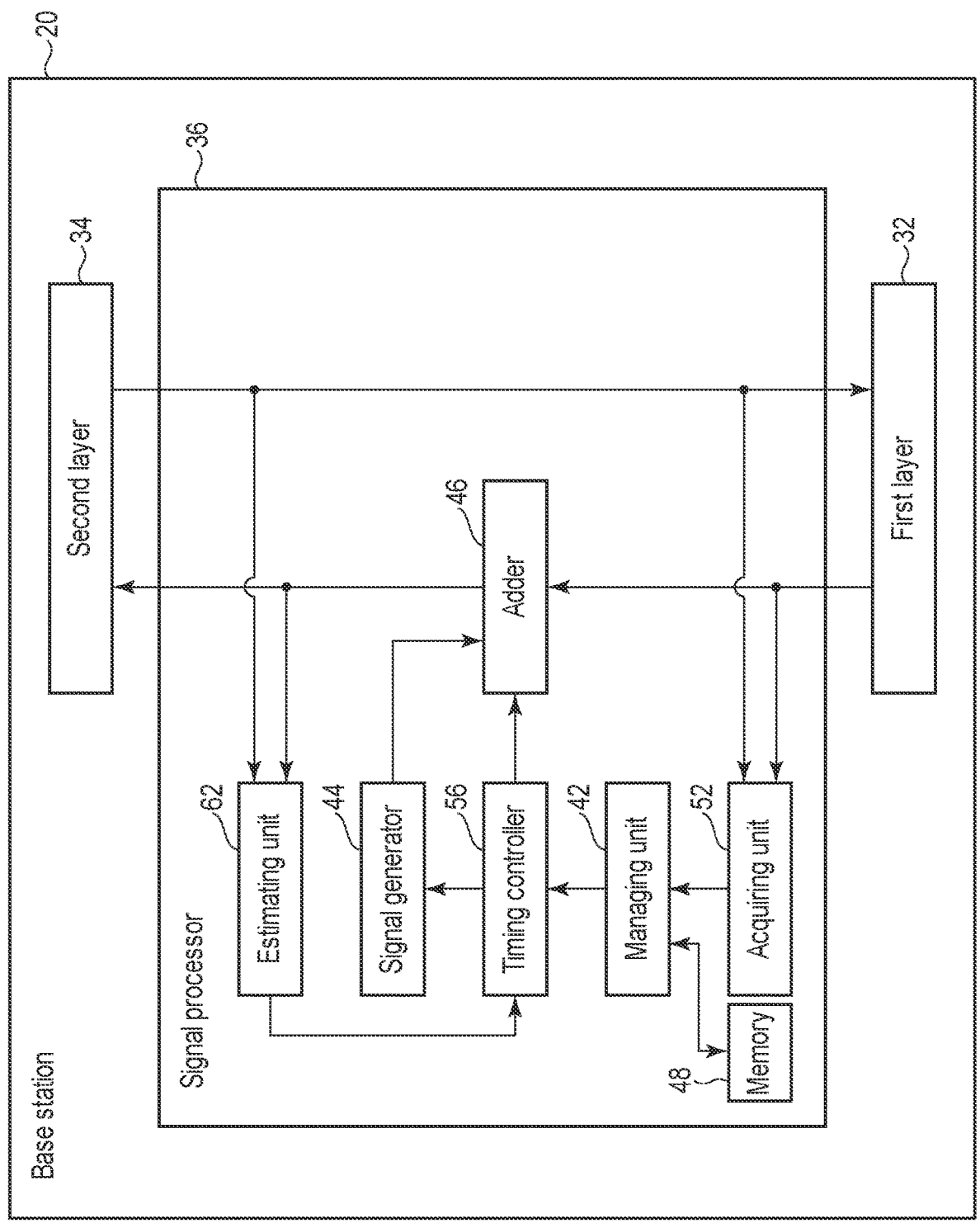
F I G. 19

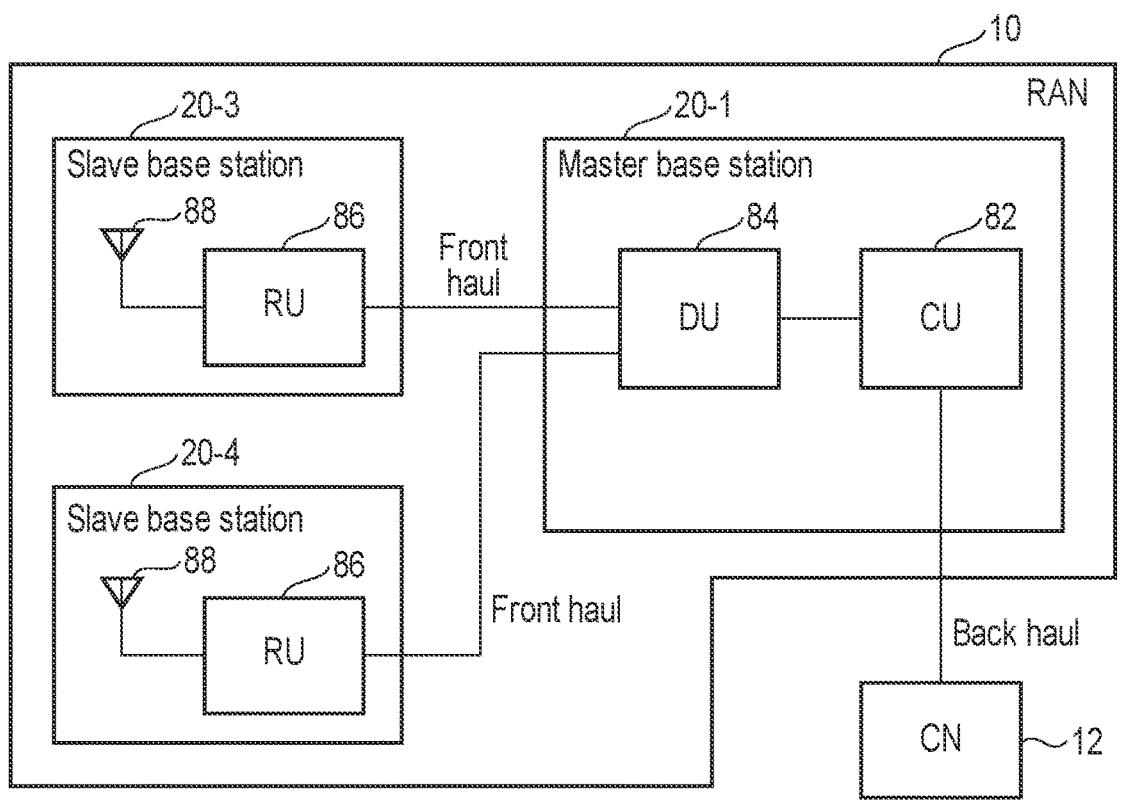
F I G. 20
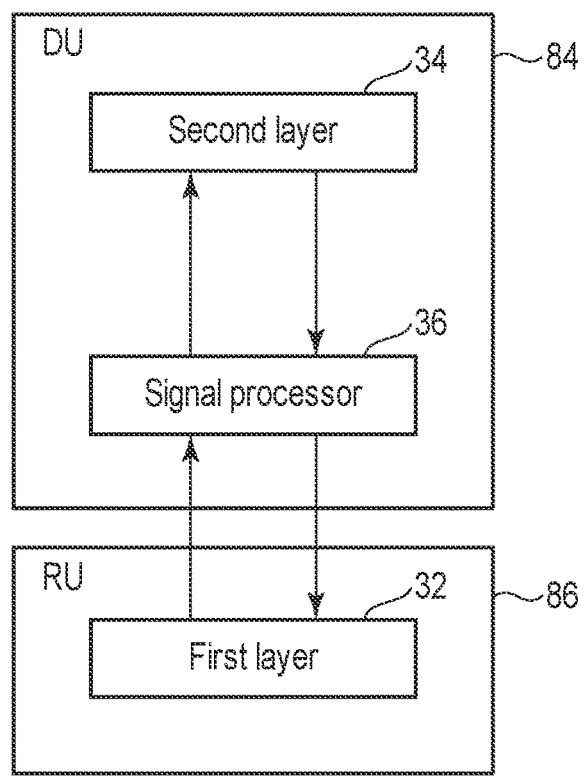
F I G. 21

ELECTRONIC APPARATUS, BASE STATION, COMMUNICATION SYSTEM, METHOD, AND STORAGE MEDIUM

CROSS-REFERENCE TO RELATED APPLICATIONS

This application is based upon and claims the benefit of priority from Japanese Patent Application No. 2022-147240, filed Sep. 15, 2022, the entire contents of which are incorporated herein by reference.

FIELD

Embodiments described herein relate generally to an electronic apparatus, a base station, a communication system, a method, and a storage medium.

BACKGROUND

A wireless communication system includes a base station that wirelessly communicates with a terminal. The base station is connected to a higher-level network. When detecting generation of data to be transmitted to the base station, the terminal transmits a scheduling request to the base station. When receiving the scheduling request, the base station allocates a radio resource to the terminal, and transmits allocation information to the terminal. When receiving the allocation information, the terminal transmits the data to the base station using the radio resource indicated by the allocation information.

The scheduling request and the allocation information are transmitted between the terminal and the base station until the terminal actually transmits the data to the base station since the terminal detects the generation of the data. Therefore, uplink communication from the terminal to the base station includes a delay time.

BRIEF DESCRIPTION OF THE DRAWINGS

FIG. 2 is a block diagram for describing an example of a base station according to the first embodiment.

FIG. 6 is a view for describing an example of a frame configuration of uplink according to the first embodiment.

FIG. 10A is a view for describing an example of a communication procedure between the base station and a terminal according to a comparative example.

FIG. 10B is a view for describing an example of a communication procedure between the base station and the terminal according to the first embodiment.

FIG. 12 is a block diagram for describing an example of the base station according to a third embodiment.

FIG. 13 is a block diagram for describing an example of the base station according to a fourth embodiment.

FIG. 15 is a block diagram for describing an example of the base station according to the sixth embodiment.

FIG. 16 is a view for describing an example of the base station according to a first modified example of the sixth embodiment.

FIG. 17 is a diagram for describing an example of the base station according to a second modified example of the sixth embodiment.

FIG. 19 is a block diagram for describing an example of the base station according to a seventh embodiment.

FIG. 20 is a block diagram for describing an example of the base station 20 according to an eighth embodiment.

FIG. 21 is a block diagram for describing an example of a first arrangement of the signal processor.

DETAILED DESCRIPTION

Figure 1:
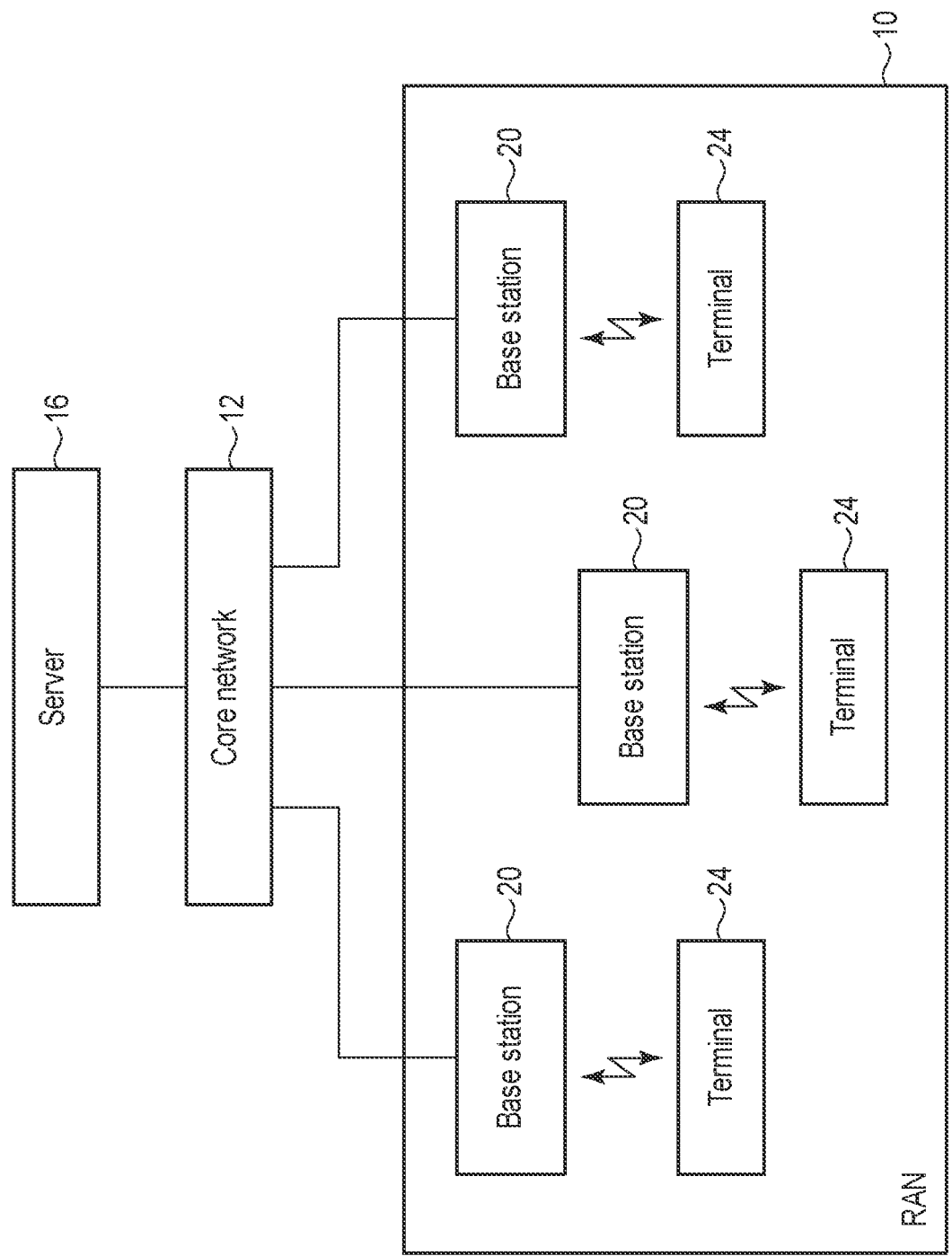
FIG. 1 is a block diagram for describing an example of a radio communication system according to a first embodiment.

Various embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes, and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, an electronic apparatus is arranged in a base station and at an interface between a first layer and a second layer. The electronic apparatus comprises a processor, and a memory configured to store allocation information indicating a radio resource with which a terminal is capable of transmitting a first control signal. The first layer is configured to transmit a physical layer signal to the second layer. The processor is configured to generate a second control signal based on the allocation information, generate a synthesis signal by adding the second control signal to the physical layer signal transmitted from the first layer based on the allocation information, and transmit the synthesis signal to the second layer.

First Embodiment

FIG. 1 is a block diagram for describing an example of a wireless communication system according to a first embodiment. The wireless communication system includes a radio access network (RAN) 10, a core network 12, and a server 16. The RAN 10 includes an antenna and a plurality of base stations 20. The base station 20 has a wireless communication device. The base station 20 is wirelessly connected to a terminal 24 by means of the wireless communication device. The terminal 24 has a wireless communication device. A plurality of terminals 24 can be connected to the base station 20. The core network 12 is a back-end network that performs various types of control such as routing. The server 16 may be located in a cloud network or may be configured by a physical server.

The core network 12 has a wired communication device. The base station 20 has a wired communication device and is connected to the core network 12 via a connection wire. The base station 20 is connected to a master station via a connection wire. The core network 12 includes a switching device, a subscriber information management device, and the like.

The terminal 24 can execute an application program in cooperation with the server 16.

In a certain application program, the terminal 24 generates uplink data and transmits the uplink data to the base station 20. The base station transmits the uplink data to the server 16 via the core network 12. The server 16 generates downlink data based on the uplink data, and transmits the downlink data to the base station 20 via the core network 12. The base station 20 transmits the downlink data to the terminal 24. In this application program, an example of the terminal 24 is a control target device of industrial robotics. An example of the uplink data is sensor information output from a sensor included in the control target device. An example of the downlink data is a drive signal that drives the operation of the control object device. The server 16 generates the drive signal based on the sensor information.

In another application program, the server 16 generates downlink data and transmits the downlink data to the base station 20 via the core network 12. The base station 20 transmits the downlink data to the terminal 24. The terminal 24 generates uplink data based on the downlink data, and transmits the uplink data to the base station 20. The base station 20 transmits the uplink data to the server 16 via the core network 12. In this application program, an example of the terminal 24 is an IoT device including a sensor. An example of downlink data is a signal requesting sensor information from the IoT device. An example of the uplink data is the sensor information. The terminal 24 acquires the sensor information from the sensor in response to the signal requesting the sensor information, and transmits the sensor information to the server 16.

The RAN 10 and the core network 12 constitute a prescribed network such as a 4th generation mobile communication system (4G system or LTE-Advanced system) standardized by the third generation partnership project (3GPP (registered trademark)), which is an example of mobile communication systems, a 5th generation mobile communication system (5G system), or a 6th generation mobile communication system (6G system) whose standardization is being examined in the 3GPP. In such a network, the base station 20 basically allocates a radio resource for both downlink communication from the base station 20 to the terminal 24 and uplink communication from the terminal 24 to the base station 20. The embodiment relates to the allocation of the radio resource for the uplink communication. The radio resource is a combination of a frequency, time, a space (spatial stream), power, a code, an orbital angular momentum, and the like.

When detecting generation of uplink data, the terminal 24 transmits a control signal for controlling communication to the base station 20. An example of the control signal is a scheduling request. The scheduling request is a signal by which the terminal 24 requests the base station 20 to allocate a radio resource. Scheduling is the allocation of the radio resource. An example of the scheduling request is transmitted via an uplink control channel physical uplink control channel (PUCCH) defined in the 3GPP.

When receiving the scheduling request, the base station 20 allocates a radio resource to which the terminal 24 can transmit the uplink data to the terminal 24, and transmits allocation information to the terminal 24. The terminal 24 having received the allocation information performs uplink communication using the allocated radio resource. An example of the uplink data is transmitted via an uplink data communication channel physical uplink shared channel (PUSCH) defined in the 3GPP.

The radio resource with which the uplink data can be transmitted is different from the radio resource with which the scheduling request can be transmitted. When detecting the connection with the terminal 24, (an RRC layer of) the base station 20 transmits allocation information (SchedulingRequst_config) indicating the radio resource with which the terminal 24 can transmit the scheduling request to the terminal 24. The terminal 24 transmits the scheduling request using the radio resource indicated by the allocation information. In this specification, the allocation information indicating the radio resource with which the scheduling request can be transmitted is also referred to as first allocation information, and the allocation information indicating the radio resource with which the uplink data can be transmitted is also referred to as second allocation information.

The allocation information represents information such as transmission performed once every milliseconds starting from a certain timing, a frequency used for transmission being F0, and a sequence of codes.

In order to transmit the uplink data in this manner, a plurality of procedures occur in the preceding stage. This plurality of procedures become a factor that increases a delay in the uplink communication. Most of a communication delay time of the terminal 24 is a delay time from transmission of the scheduling request to reception of the allocation information. Furthermore, the fact that a timing at which the terminal 24 can transmit the scheduling request is limited is also a factor of the delay. That is, a waiting time from a generation timing of the uplink data to the transmission of the scheduling request is also a factor that increases the delay in the uplink communication.

The embodiment reduces the waiting time from the generation timing of the uplink data to the transmission of the scheduling request, and reduces the delay in the uplink communication. The embodiment reduces the delay by changing the base station 20 without changing the terminal 24.

FIG. 2 is a block diagram for describing an example of the base station 20 according to the first embodiment. The base station 20 includes multiple functional units (referred to as layers) which are logically divided. A signal processor 36 is arranged at an interface between a first layer 32 and a second layer 34 among the multiple layers. The signal processor 36 is connected to the first layer 32 and the second layer 34. The connection may be any of wired, wireless, or logical connection. The signal processor 36 may be referred to as a processing device or an electronic apparatus.

The embodiment relates to reduction of a delay in uplink communication. The base station 20 according to the embodiment generates the scheduling request on behalf of the terminal 24 and adds the scheduling request to an uplink signal. The uplink signal output from the first layer 32 is input to the second layer 34 via the signal processor 36. The signal processor 36 performs signal processing on the uplink signal and transmits the processed uplink signal to the second layer 34. The signal processor 36 does not perform any signal processing on a downlink signal and transmits the downlink signal as it is to the first layer 32. The downlink signal is a generic term for downlink data and allocation information.

The signal processor 36 includes an input unit 40, a managing unit 42, a signal generator 44, an adder 46, and a memory 48. An example of the input unit 40 is a keyboard. The input unit 40 may be referred to as an input circuitry. The signal processor 36 may not include the input unit 40. The input unit 40 may be provided in the base station 20 outside the signal processor 36. The signal processor 36 may not include the memory 48. The memory 48 may be provided in the base station 20 outside the signal processor 36. The memory 20 may further be provided outside the base station 20. A storage in a cloud system may be used as the memory 48.

The signal processor 36 does not receive a notification regarding the first allocation information indicating the radio resource with which the terminal 24 can transmit the scheduling request from the base station 20 or is not capable of acquiring the first allocation information directly from the base station 20. Thus, an operator of the base station 20 uses the input unit 40 to input the first allocation information indicating the radio resource with which the terminal 24 can transmit the scheduling request. The operator of the base station 20 may input the first allocation information from an outside of the base station 20 using the input unit 40. The managing unit 42 writes the first allocation information into the memory 48. The managing unit 42 reads the first allocation information from the memory 48, and transmits the first allocation information to the signal generator 44 and the adder 46. The signal generator 44 generates a scheduling request for controlling communication based on the first allocation information. The scheduling request generated by the signal generator 44 is a signal equivalent to the scheduling request transmitted by the terminal 24. In this specification, the scheduling request transmitted by the terminal 24 is also referred to as a first scheduling request (or a first control signal), and the scheduling request generated by the signal generator 44 is also referred to as a second scheduling request (or a second control signal).

The signal generator 44 transmits the second scheduling request to the adder 46 based on the first allocation information. The adder 46 adds the second scheduling request to the uplink signal transmitted from the first layer 32 to the second layer 34 based on the first allocation information. Thereby, the adder 46 generates a synthesis signal. The synthesis signal output from the adder 46 is transmitted to the second layer 34 as the uplink signal from the first layer 32. The signal processor 36 transmits the uplink signal added with the scheduling request to the second layer 34. The signal processor 36 does not perform any processing on a downlink signal from the second layer 34. The signal processor 36 transmits the downlink signal from the second layer 34 to the first layer 32 as it is.

FIG. 2 illustrates an example in which the signal processor 36 is configured by a plurality of processing circuitry (the managing unit 42, the signal generator 44, and the adder 46) that respectively implement a plurality of functions. However, the signal processor 36 may be configured by a single processing circuitry that implements a plurality of functions. The single processing circuitry or each of a plurality of processing circuitry may be configured by hardware such as an FPGA. The single processing circuitry or each of a plurality of processing circuitry may be configured by a CPU. The CPU can implement the functions of the signal processor 36 by executing a program. The program executed by the CPU is stored in a nonvolatile memory.

An example of a connection point of the signal processor 36 in the base station 20, that is, an interface between the first layer 32 and the second layer 34 will be described.

Figure 3:
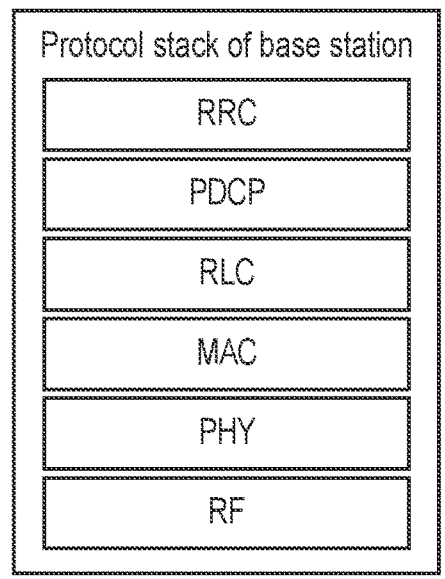
FIG. 3 is a view for describing an example of a protocol stack of the base station according to the first embodiment.

FIG. 3 is a view for describing an example of a protocol stack of the base station 20 according to the first embodiment. In the definition of the 3GPP, the base station 20 includes a radio resource control (RRC) layer, a packet data convergence protocol (PDCP) layer, a radio link control (RLC) layer, a media access control (MAC) layer, a physical (PHY) layer, and a radio frequency (RF) layer. The RF layer is connected to the antenna. The RRC layer is connected to the core network 12. Each of the RLC layer, the MAC layer, and the PHY layer is sometimes further divided into a high layer and a low layer. Each of the layers includes at least one processing circuitry.

Figure 4:
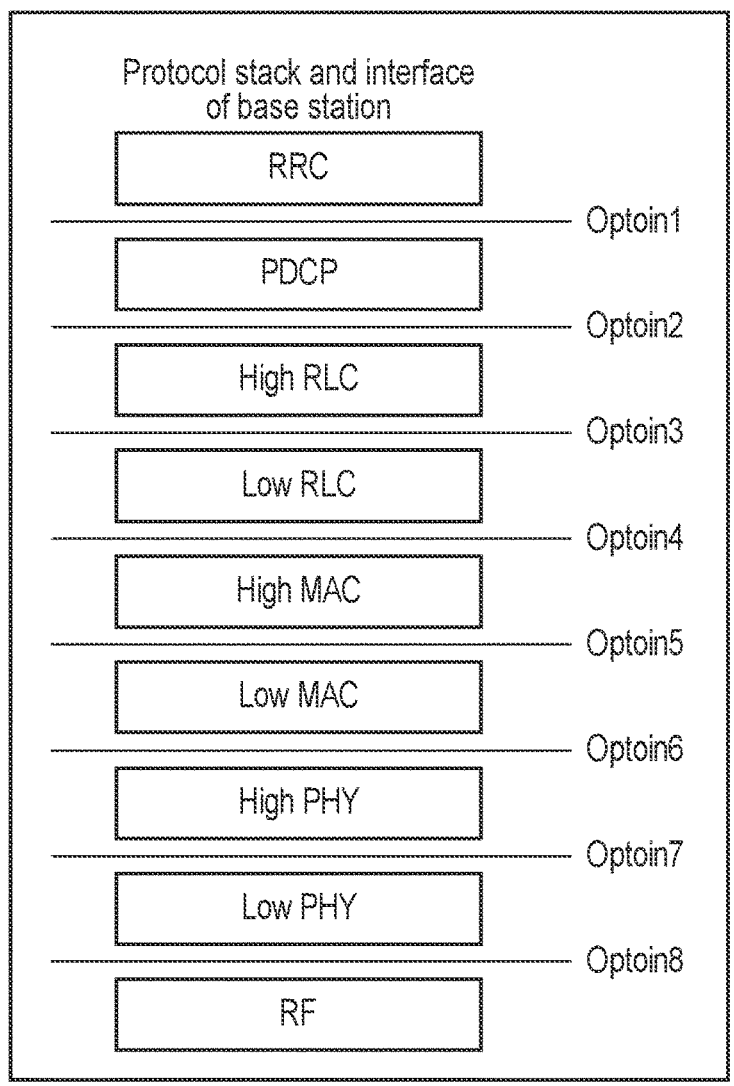
FIG. 4 is a view for describing an example of a protocol stack and an interface of the base station according to the first embodiment.

FIG. 4 is a view for describing an example of a protocol stack and an interface of the base station according to the first embodiment. The RLC layer is divided into a high RLC layer and a low RLC layer. The MAC layer is divided into a high MAC layer and a low MAC layer. The PHY layer is divided into a high PHY layer and a low PHY layer. The low PHY layer is connected to the RF layer.

A standard interface can be constructed between the respective layers. In the 3GPP, interfaces between the respective layers are defined up to Option 1 to Option 8. An interface between the RRC layer and the PDCP layer is Option 1. Similarly, an interface between the high PHY layer and the low PHY layer is Option 7. An interface between the low PHY layer and the RF layer is Option 8.

The Open RAN Alliance (O-RAN), which is an industry association that formulates RAN specifications, proposes a configuration called O-RAN split option 7-2× in which Option 7 defined by the 3GPP is subdivided into Option 7-1 and an Option 7-2.

Figure 5:
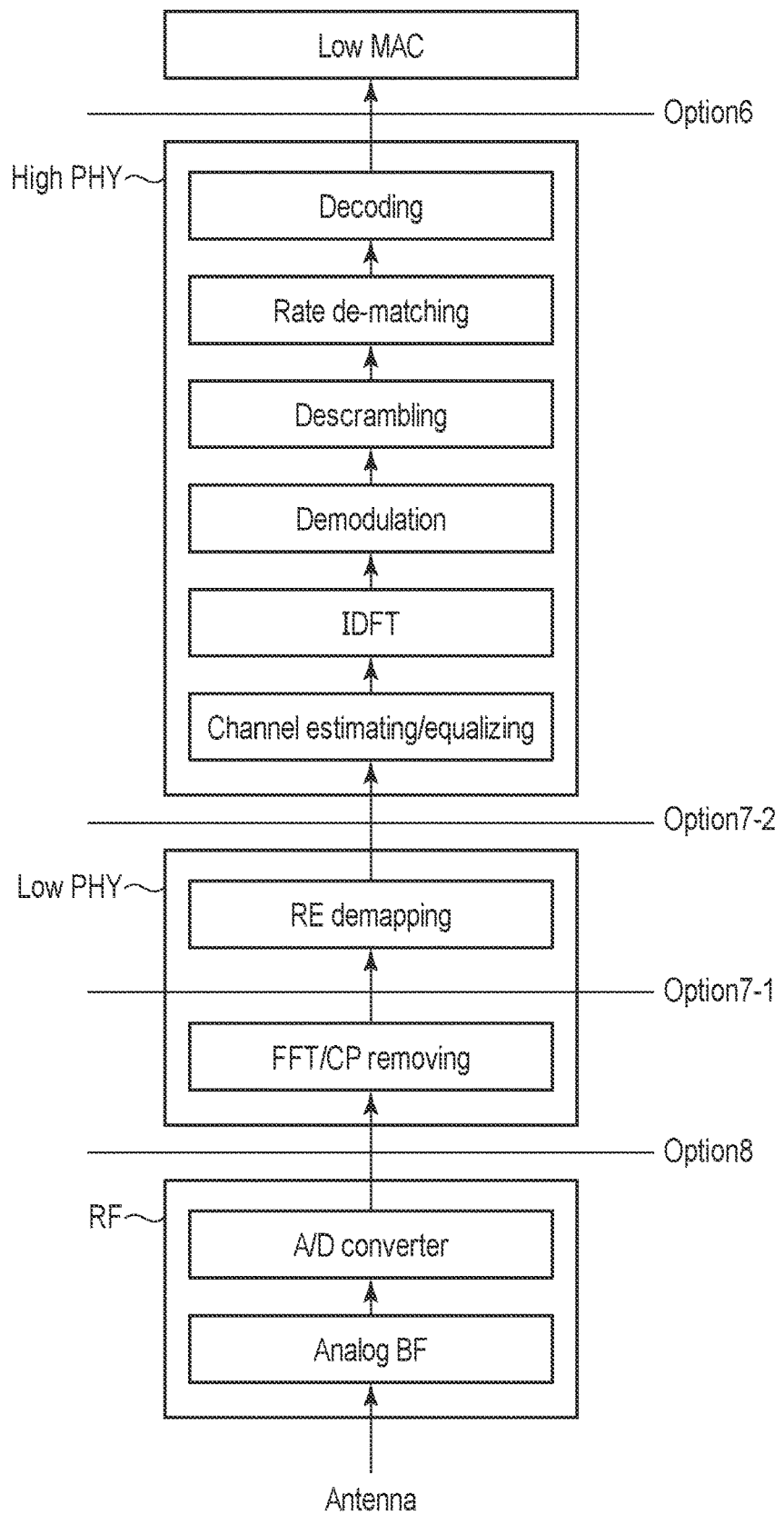
FIG. 5 is a view for describing an example of processing circuitry related to an uplink of RF layer, low PHY layer, and high PHY layer according to the first embodiment.

FIG. 5 is a view for describing an example of processing circuitry related to an uplink of the RF layer, the low PHY layer, and the high PHY layer according to the first embodiment in a case where the O-RAN split option 7-2× is adopted.

The RF layer includes an analog beamforming (analog BF) unit and an A/D converter. The analog BF unit controls the directivity of a radio frequency signal (RF signal) received by the antenna (array antenna). The A/D converter converts the RF signal into a digital signal and transmits the digital signal to the low PHY layer. The digital signal received by the low PHY layer is referred to as a physical layer signal.

The low PHY layer includes a Fast Fourier transform (FFT)/continuous pilot (CP) removing unit and a resource element demapping (RE demapping) unit. The low PHY layer performs FFT processing on the digital signal (orthogonal frequency-division multiplexing (OFDM) signal in a time domain) output from the RF layer, removes a pilot signal (continuous pilot signal) from the OFDM signal, and further performs RE demapping to generate an in-phase/quadrature (I/Q) sample sequence of the OFDM signal in a frequency domain.

The OFDM is one of digital modulation systems, and refers to a multi-carrier modulation system in which a transmission signal is modulated with orthogonal subcarriers and information bits are transmitted in parallel with a plurality of carrier waves.

The high PHY layer includes a channel estimating and equalizing unit, an inverse discrete Fourier transform (IDFT) unit, a demodulation unit, a descrambling unit, a rate de-matching unit, and a decoding unit. The high PHY layer performs channel estimating and equalizing processing, IDFT processing, demodulation processing, descrambling processing, and decoding processing on the I/Q sample sequence of the OFDM signal in the frequency domain, and transmits a bit sequence to the MAC layer (low MAC layer). This bit sequence is referred to as a MAC layer signal. That is, the low PHY layer and the high PHY layer perform various types of processing on the physical layer signal and convert the physical layer signal into a MAC layer signal.

BF processing has been performed on an analog signal, but may be performed on a digital signal. In such a case, a digital BF unit is provided between the FFT/CP removing unit and the RE demapping unit.

The signal processor 36 is arranged in the PHY layer (the low PHY layer or the high PHY layer). The signal processor 36 may be arranged at an interface of Option 7-1. Option 7 defined as the interface between the low PHY layer and the high PHY layer in the 3GPP is Option 7-1 in the O-RAN. In this case, the first layer 32 is the FFT/CP removing unit of the low PHY layer. The second layer 34 is the RE demapping unit of the low PHY layer. In the case of digital processing, the first layer 32 is the digital BF unit of the low PHY layer. The second layer 34 is the RE demapping unit of the low PHY layer.

The signal processor 36 may be arranged at an interface of Option 7-2. In this case, the first layer 32 is the low PHY layer. The second layer 34 is the high PHY layer.

Furthermore, the signal processor 36 may be arranged at an interface between adjacent processing circuitry in the high PHY layer that is not currently standardized. The signal processor 36 may be arranged at an interface between the channel estimating and equalizing unit and the IDFT unit, an interface between the IDFT unit and the demodulation unit, an interface between the demodulation unit and the descrambling unit, an interface between the descrambling unit and the rate de-matching unit, or an interface between the rate de-matching unit and the decoding unit.

Since the signal processor 36 is arranged in the PHY layer, the uplink signal transmitted from the first layer 32 to the signal processor 36 is the physical layer signal. The uplink signal transmitted from the signal processor 36 to the second layer 34 is also the physical layer signal. The base station 20 includes a scheduler that allocates the radio resource to the terminal 24. The MAC layer includes the scheduler. The base station 20 is divided into two functional units such that the scheduler is included in the second layer 34.

FIG. 6 is a view for describing an example of a frame configuration of the uplink according to the first embodiment. This frame configuration conforms to a 5G frame configuration. In the 5G system, a frame having a predetermined time length is defined. The time length of the frame is 10 milliseconds (10 msec). One frame includes ten subframes each having a predetermined time length. A time length of the subframe is 1 msec.

The 5G system defines five types of subcarrier intervals of 15 kHz ($\mu=0$), 30 kHz ($\mu=1$), 60 kHz ($\mu=2$), 120 kHz ($\mu=3$), and 240 kHz ($\mu=5$). Here, $\mu$ is a value for identifying the subcarrier interval.

The 5G system defines a unit called a slot. The slot includes fourteen OFDM symbols. The OFDM symbol has a different time length depending on the subcarrier interval. Therefore, a time length of the slot varies depending on the subcarrier interval.

One subframe includes at least one slot. When the subcarrier interval is set to 15 kHz, one subframe includes one slot. When the subcarrier interval is set to 30 kHz, one subframe includes two slots. When the subcarrier interval is set to 60 kHz, one subframe includes four slots. When the subcarrier interval is set to 120 kHz, one subframe includes eight slots. When the subcarrier interval is set to 240 kHz, one subframe includes sixteen slots.

Figure 7:
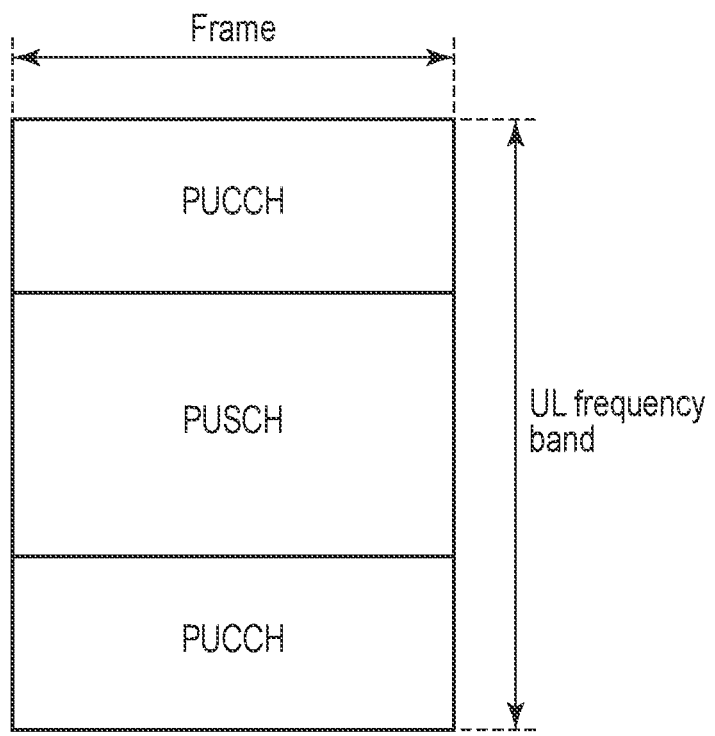
FIG. 7 is a view for describing an example of a configuration of one frame of the uplink according to the first embodiment.

FIG. 7 is a view for describing an example of a configuration of one frame of the uplink according to the first embodiment. In FIG. 7, the horizontal axis represents time, and the vertical axis represents a frequency. One frame includes two types of physical channels of a control channel PUCCH and a data communication channel PUSCH. The control channel PUCCH is a channel used to transmit the scheduling request. The data communication channel PUSCH is a shared data channel for user data in the uplink communication. Pieces of data of all users are aggregated and transmitted by the data communication channel PUSCH.

The control channel PUCCH and the data communication channel PUSCH are shared by a plurality of users.

The control channel PUCCH uses a highest frequency band and a lowest frequency band in an uplink (UL) frequency band. The data communication channel PUSCH uses a central band other than the band of the control channel PUCCH.

Figure 8:
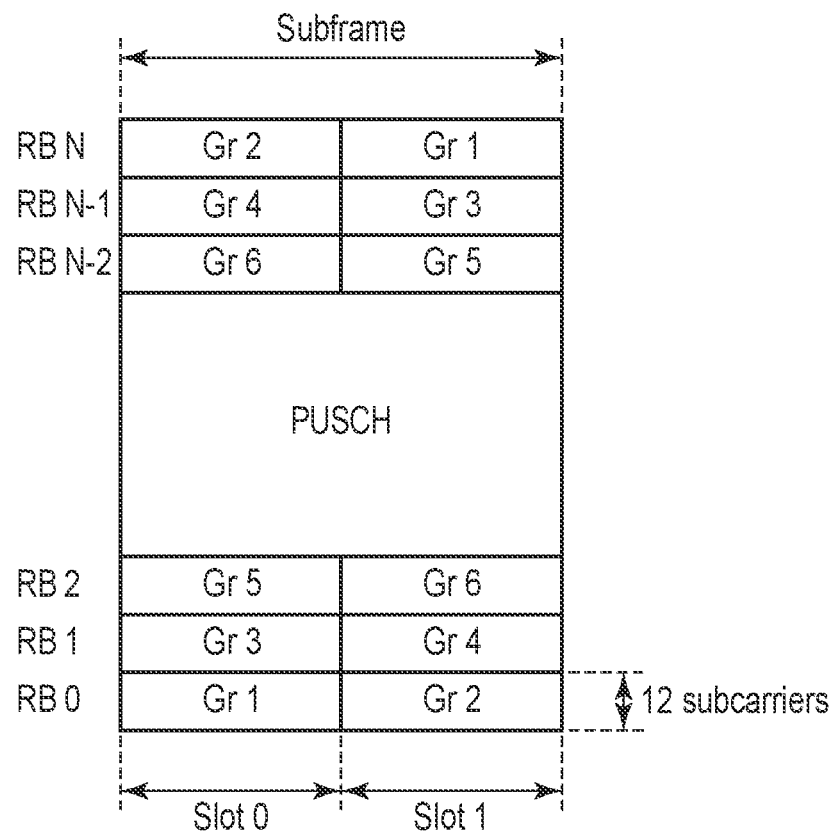
FIG. 8 is a view for describing an example of a configuration of one subframe of the uplink according to the first embodiment.

FIG. 8 is a view for describing an example of a configuration of one subframe of the uplink according to the first embodiment. A subframe period of 1 millisecond is divided into two slots (slot 0 and slot 1). The terminal 24 is classified into any of a plurality of terminal groups Gr. A plurality of terminals 24 belong to one terminal group Gr. The control channel PUCCH is allocated to the terminal group Gr for each pair of resource blocks (RBs) at opposite ends of the uplink frequency band. Therefore, the scheduling requests (PUCCH) from a plurality of terminals 24 can be transmitted in one subframe. The resource block RB is a minimum allocation unit of the radio resource. One resource block RB includes twelve subcarriers in a frequency direction and seven symbols in a time direction. A transmission time interval (TTI) for scheduling is one subframe.

RB 0 of the slot 0 and RB N of the slot 1 are allocated to the control channel PUCCH of a terminal group Gr1. RB 0 in the slot 1 and RB N in the slot 0 are allocated to the control channel PUCCH of the terminal group Gr2. Similarly, RB 2 in the slot 1 and RB N-2 in the slot 0 are allocated to the control channel PUCCH of the terminal group Gr6.

Figure 9:
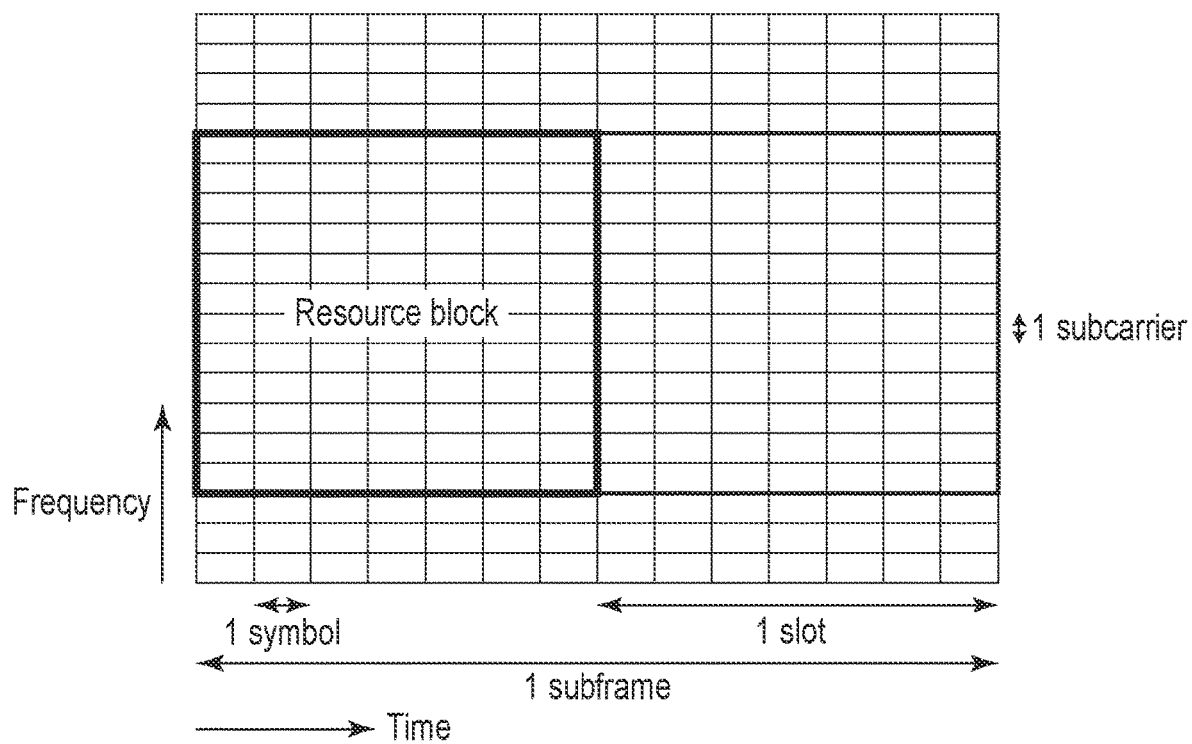
FIG. 9 is a view for describing an example of a resource block according to the first embodiment.

FIG. 9 is a view for describing an example of the resource block according to the first embodiment. One subframe includes two resource blocks.

FIGS. 10A and 10B are views for describing examples of a communication procedure between the base station 20 and the terminal 24 according to the first embodiment in comparison with a comparative example. FIG. 10A illustrates a communication procedure according to the comparative example. The comparative example is a base station that includes no signal processor 36. FIG. 10B illustrates the communication procedure according to the first embodiment. FIGS. 10A and 10B illustrate the communication procedures in a case where time is allocated as the radio resource.

In both the embodiment and the comparative example, a plurality of terminals 24 can be connected to the base station 20. In the case where the time is used as the radio resource, a timing 1 to a timing 19 are defined as options of the radio resource. The timing 1 to the timing 19 are repeatedly defined. Numbers 1 to 19 in FIGS. 10A and 10B are timing indices. Character U in FIGS. 10A and 10B represents the uplink communication. Character D in FIGS. 10A and 10B represents the downlink communication. In a certain terminal 24, uplink (UL) data is generated at the timing 15. Timings at which the terminal 24 can transmit the first scheduling request have been determined in advance. The predetermined timings are, for example, the timing 9 and the timing 19. The base station 20 transmits the first allocation information indicating these timings to the terminal 24 before the operation in FIGS. 10A and 10B.

In the comparative example, a certain terminal 24 transmits the first scheduling request (SR) to the base station 20 at the timing 19 indicated by the first allocation information after generation of uplink data at the timing 15.

In response to the first scheduling request, the base station 20 allocates a certain timing, for example, the timing 10, as the radio resource at which the uplink data can be transmitted to a certain terminal 24, and transmits the second allocation information indicating the timing 10 to the certain terminal 24. Timings at which downlink communication of the second allocation information is performed have also been determined in advance. The predetermined timings are, for example, the timing 7 and the timing 17. The base station 20 transmits the second allocation information to the certain terminal 24 at the timing 7.

The certain terminal 24 transmits the uplink data to the base station 20 at the timing 10 based on the second allocation information.

In the comparative example, a communication delay time is a sum of a delay time from the generation timing 15 of the uplink data to the transmission timing 19 of the first scheduling request, a delay time from the transmission timing 19 of the first scheduling request to the reception timing 7 of the second allocation information, and a delay time from the reception timing 7 of the second allocation information to the transmission timing 10 of the uplink data.

In the first embodiment, the first allocation information indicating the timing 9 and the timing 19 at which a certain terminal 24 can transmit the first scheduling request is stored in the memory 48.

As illustrated in FIG. 10B, the signal generator 44 generates the second scheduling request at the timing 9 indicated by the first allocation information regardless of whether or not the uplink data is generated. The adder 46 adds the second scheduling request to the physical layer signal and transmits the synthesis signal to the second layer 34 at the timing 9.

In response to the synthesis signal including the second scheduling request, the scheduler in the second layer 34 allocates a certain timing, for example, a timing 20, as the radio resource with which the uplink data can be transmitted to the certain terminal 24. The base station 20 transmits the second allocation information indicating the timing 20 to the certain terminal 24. Since the timings to transmit the second allocation information are the timing 7 and the timing 17, the base station 20 transmits the second allocation information to the certain terminal 24 at the timing 7.

The certain terminal 24 transmits the uplink data to the base station 20 at the timing 20 based on the second allocation information.

According to the first embodiment, the second scheduling request is generated before the generation of the uplink data, and the timing at which the second information allocation information is transmitted from the base station 20 to the terminal 24 is advanced as compared with the comparative example. The communication delay time is a sum of a delay time from the generation timing 15 of the uplink data to the reception timing 17 of the second allocation information and a delay time from the reception timing 17 of the second allocation information to the transmission timing 20 of the uplink data.

The signal processor 36 according to the first embodiment has the following effects. Typically, signals transmitted from a plurality of users (terminals 24) propagate in space and are combined and received by the antenna of the base station 20. This combination is simple addition processing in terms of arithmetic processing. Therefore, even after the first layer 32 of the base station 20 converts a reception signal into a baseband signal, even after digitizing the baseband signal, or even after performing the BF processing or the FFT processing on the digital signal, it is possible to generate a synthesis signal equivalent to the synthesis signal generated by the antenna when the signal subjected to the above processing is added. Therefore, the signal processor 36 utilizes the addition processing.

The signal generator 44 generates the second scheduling request, and the adder 46 adds the second scheduling request to the physical layer signal. As a result, even when the terminal 24 does not transmit the first scheduling request, the signal processor 36 can adds the second scheduling request to the physical layer signal and transmit the synthesis signal to the second layer 34. Therefore, even when the terminal 24 does not generate the first scheduling request, the signal processor 36 can generate a scheduling request equivalent to the scheduling request transmitted by the terminal 24 by adding the second scheduling request to the physical layer signal. Moreover, the signal processor 36 transmits the synthesis signal including the second scheduling request to the scheduler before the generation timing of the uplink data. Therefore, the reception timing (timing 17) of the second allocation information is made earlier than the reception timing (timing 7 of the next cycle) of the comparative example. If the second scheduling request is generated using all radio resources that can be used for transmission based on the first allocation information and added to the physical layer signal, the maximum delay reduction effect can be obtained.

As a result, a delay time can be shortened without changing the terminal 24. In the first embodiment, only the scheduling request is added to the physical layer signal. Therefore, no change is added to a series of processes typically performed in the base station 20. Thus, it is also possible to reduce the risk of malfunction of the series of processes in the base station 20.

Other embodiments will be described hereinafter. In the other embodiments, the same elements as those in the first embodiment will be denoted by the same reference numerals, and the detailed description thereof will be omitted. Block diagrams of wireless communication systems according to the other embodiments are the same as the block diagram of the first embodiment illustrated in FIG. 1. The description of FIGS. 3 to 9 related to the first embodiment is also applied to the other embodiments.

Second Embodiment

Figure 11:
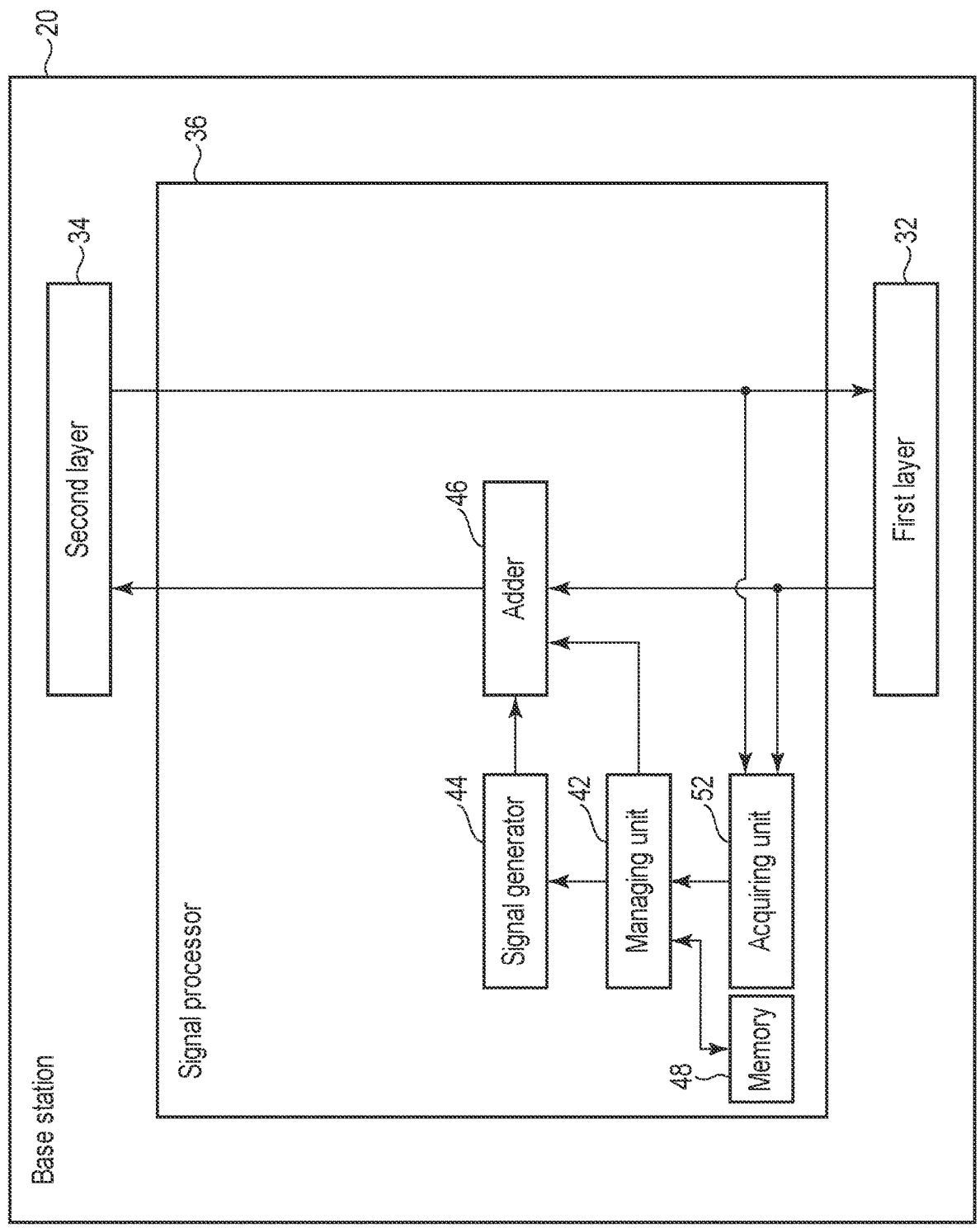
FIG. 11 is a block diagram for describing an example of the base station according to a second embodiment.

FIG. 11 is a block diagram for describing an example of a base station 20 according to a second embodiment. The base station 20 according to the second embodiment is made by removing the input unit 40 from the base station (FIG. 2) 20 according to the first embodiment, but instead, adding an acquiring unit 52. At least one of a first physical layer signal transmitted from the first layer 32 to the adder 46 and a second physical layer signal transmitted from the second layer 34 to the first layer 32 is also transmitted to the acquiring unit 52.

The acquiring unit 52 can detect a timing of first allocation information (SchedulingRequst_config) when observing the first allocation information in the first physical layer signal transmitted from the first layer 32 and the second physical layer signal transmitted from the second layer 34 for a fixed period. As a result, the acquiring unit 52 can acquire the first allocation information.

According to the second embodiment, an input of the first allocation information by an operator of the base station 20 according to the first embodiment can be omitted. The description of FIGS. 10A and 10B is also applied to the second embodiment.

Third Embodiment

FIG. 12 is a block diagram for describing an example of a base station 20 according to a third embodiment. The base station 20 according to the third embodiment includes the same elements as those of the base station 20 according to the second embodiment. The acquiring unit 52 of the third embodiment acquires first allocation information by a method different from that of the second embodiment. In the second embodiment, the first allocation information is acquired by observing the physical layer signal transmitted between the first layer 32 and the second layer 34 for a fixed period. An RRC layer in the second layer 34 transmits the first allocation information (SchedulingRequst_config) indicating a predetermined radio resource to not only the terminal 24 but also the acquiring unit 52.

In the third embodiment as well, the acquiring unit 52 can acquire the first allocation information transmitted from the second layer 34 in a short period of time. According to the third embodiment as well, an input of the first allocation information by an operator of the base station 20 according to the first embodiment can be omitted.

The second embodiment and the third embodiment may be combined. That is, at least one of the first physical layer signal transmitted from the first layer 32 to the adder 46 and the second physical layer signal transmitted from the second layer 34 to the first layer 32 may be transmitted to the acquiring unit 52, and the first allocation information from the RRC layer in the second layer 34 may be transmitted to the acquiring unit 52. This increases the possibility that the acquiring unit 52 correctly acquires the first allocation information.

According to the first to third embodiments, when the signal generator 44 transmits the second scheduling request at all timings indicated by the first allocation information, a synthesis signal including the second scheduling request is transmitted to the second layer 34 even though no uplink data is generated, and a transmission timing of the uplink data is allocated in response to the second scheduling request. As a result, there is a possibility that a radio resource (timing at which the uplink data can be transmitted) is not allocable to another terminal. A fourth embodiment to a seventh embodiment capable of solving this problem and effectively using the radio resource will be described.

Fourth Embodiment

FIG. 13 is a block diagram for describing an example of a base station 20 according to the fourth embodiment. The base station 20 according to the fourth embodiment is made by adding a timing controller 56 to the base station (FIG. 2) 20 according to the first embodiment.

The managing unit 42 transmits first allocation information to the signal generator 44 and the timing controller 56. The timing controller 56 selects some timings among a plurality of allocation timings of the second scheduling request indicated by the first allocation information. Some timings include at least one timing. The timing controller 56 transmits information indicating the selected some timings to the adder 46.

The signal generator 44 generates the second scheduling request and transmits the second scheduling request to the adder 46. The adder 46 adds the second scheduling request to the physical layer signal at a timing transmitted from the timing controller 56 to generate the physical layer signal.

The timing controller 56 selects the number of timings according to a level of delay reduction required for uplink communication from a plurality of timings indicated by the first allocation information. The timing controller 56 acquires the required level of delay reduction by any method. An acquisition method may be reception of a signal from the server 16 or setting/input by an operator of the base station 20.

In a case where the delay reduction in the uplink communication is required, the timing controller 56 selects a large number of timings. The signal generator 44 generates a large number of second scheduling requests at the selected timings. The adder 46 adds a large number of second scheduling requests to a large number of physical layer signals at a large number of timings. As a result, a large number of second scheduling requests are transmitted to the second layer 34, and a large radio resource (uplink data transmission timings) is allocated, so that the delay is reduced.

Conversely, in a case where the delay reduction in the uplink communication is not required to such an extent, the timing controller 56 selects a small number of timings and generates a small number of second scheduling requests at the selected timings. The adder 46 adds a small number of second scheduling requests to a small number of physical layer signals at a small number of timings. As a result, the small number of second scheduling requests are transmitted to the second layer 34, and a small radio resource (uplink data transmission timings) is allocated, so that fairness of communication is achieved rather than the delay reduction.

According to the fourth embodiment, the second scheduling request is generated in response to a request for communication, and thus, it is possible to prevent a situation in which a radio resource is unnecessarily allocated in spite of absence of the uplink data. It is possible to use the radio resource more efficiently.

Fifth Embodiment

Figure 14:
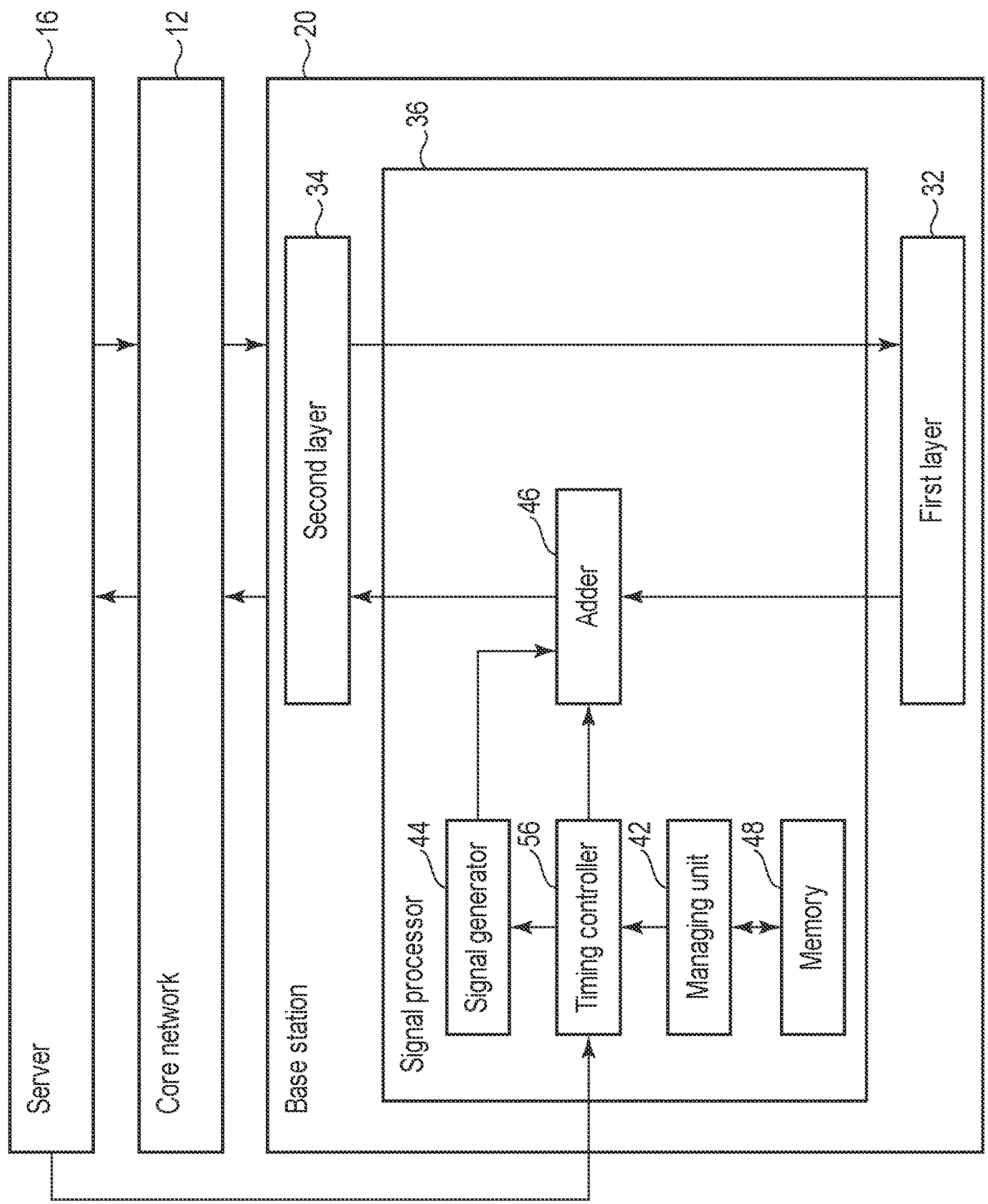
FIG. 14 is a block diagram for describing an example of the base station according to a fifth embodiment.

FIG. 14 is a block diagram for describing an example of a base station 20 according to a fifth embodiment. The base station 20 according to the fifth embodiment includes the same elements as those of the base station 20 according to the fourth embodiment. The timing controller 56 does not control the number of timings to be selected, but controls a timing itself to be selected. The timing controller 56 is connected to the server 16.

The server 16 determines a timing at which uplink data is generated from information indicating various requests for uplink communication, such as a frequency of the uplink communication, a timing of the uplink communication, a communication amount of the uplink communication, and a level of delay reduction required for the uplink communication. The server 16 transmits information indicating a timing at which the uplink data is generated to the timing controller 56. The timing controller 56 detects the timing at which the uplink data is generated according to the information from the server 16, and extracts a detected timing from among a plurality of timings indicated by the first allocation information. The timing controller 56 transmits information indicating the extracted timing to the signal generator 44 and the adder 46.

The signal generator 44 generates the second scheduling request at a timing indicated by the information transmitted from the timing controller 56 and transmits the second scheduling request to the adder 46. The adder 46 adds the second scheduling request to the physical layer signal at a timing indicated by the information transmitted from the timing controller 56.

The uplink data is generated after a fixed period of time elapses from downlink communication in an application program in which the server 16 inquires about a temperature of the terminal 24 in the downlink communication, and the terminal 24 returns the temperature to the server 16 in the uplink communication. The server 16 transmits information indicating a generation timing of the uplink data to the timing controller 56 using a timing after the lapse of the fixed period of time since the downlink communication as the generation timing of the uplink data. As a result, the signal generator 44 generates the second scheduling request slightly before the generation timing of the uplink data and transmits the second scheduling request to the adder 46. The adder 46 adds the second scheduling request to the physical layer signal slightly before the generation timing of the uplink data.

According to the fifth embodiment as well, it is possible to prevent a situation in which a radio resource is unnecessarily allocated in spite of absence of the uplink data. It is possible to use the radio resource more efficiently.

Sixth Embodiment

FIG. 15 is a block diagram for describing an example of a base station 20 according to the sixth embodiment. The base station 20 according to the sixth embodiment is made by adding an estimating unit 62 to the base station 20 according to the fifth embodiment. An arrangement position of the estimating unit 62 can be selected from various positions, but the estimating unit 62 is arranged in the signal processor 36.

According to the fifth embodiment, the generation timing of uplink data is determined based on a generation timing at which data to be transmitted from the server 16 via the core network 12 and the base station 20. According to the sixth embodiment, the generation timing of the uplink data is estimated from the physical layer signal transmitted between the first layer 32 and the second layer 34. At least one of the synthesis signal transmitted from the adder 46 to the second layer 34 and the second physical layer signal transmitted from the second layer 34 to the first layer 32 is also transmitted to the estimating unit 62.

The estimating unit 62 estimates the generation timing of the uplink data by observing the physical layer signal transmitted between the first layer 32 and the second layer 34. The estimating unit 62 transmits information indicating the estimated timing to the timing controller 56.

The timing controller 56 detects the estimated timing at which the uplink data is generated according to the information from the estimating unit 62, and extracts the detected timing from among a plurality of timings indicated by the first allocation information. The subsequent processing is the same as that in the fifth embodiment.

According to the sixth embodiment as well, the second scheduling request is generated in response to a request for communication. Thus, it is possible to prevent a situation in which a radio resource is unnecessarily allocated in spite of absence of the uplink data. It is possible to use the radio resource more efficiently. Furthermore, it is unnecessary to transmit a signal indicating a transmission timing of the uplink data from the server 16 to the base station according to the sixth embodiment. Therefore, the generation timing of the uplink data can be obtained by the base station 20 alone without requiring connection with the server 16.

Modified examples of the sixth embodiment related to a change of the arrangement position of the estimating unit 62 will be described.

FIG. 16 is a view for describing an example of the base station 20 according to a first modified example of the sixth embodiment. The base station 20 of FIG. 16 includes the first layer 32, the second layer 34, the signal processor 36, and a second signal processor 36A. The signal processor 36 may be referred to as the first signal processor 36. The second signal processor 36A is an equivalent circuitry of the estimating unit 62. The second signal processor 36A estimates the generation timing of the uplink data by observing the physical layer signal transmitted between the first layer 32 and the second layer 34. The second signal processor 36A transmits information indicating the estimated timing to the timing controller 56. The second signal processor 36A may be formed of the signal processor 36 according to any of the above described embodiments. The second signal processor 36A is arranged in the base station 20 but outside the signal processor 36. The first modified example is the same as the sixth embodiment in that at least one of the synthesis signal transmitted from the adder 46 to the second layer 34 and the second physical layer signal transmitted from the second layer 34 to the first layer 32 is also transmitted to the second signal processor 36A corresponding to the estimating unit 62. Therefore, the first modified example achieves the same functions and effects as those of the sixth embodiment.

FIG. 17 is a diagram for describing an example of the base station 20 according to a second modified example of the sixth embodiment. The second signal processor 36A is arranged outside the base station 20. The second signal processor 36A is a device independent of the base station 20. The physical layer signal transmitted between the first layer 32 and the second layer 34 of the base station 20 is not transmitted to the second signal processor 36A. Instead, at least one of a signal transmitted from the base station 20 to the core network 12 and a signal transmitted from the core network 12 to the base station 20 is also transmitted to the second signal processor 36A. The second signal processor 36A can also estimate a transmission timing of uplink data from these signals. Therefore, the second modified example also achieves the same functions and effects as the sixth embodiment.

Figure 18:
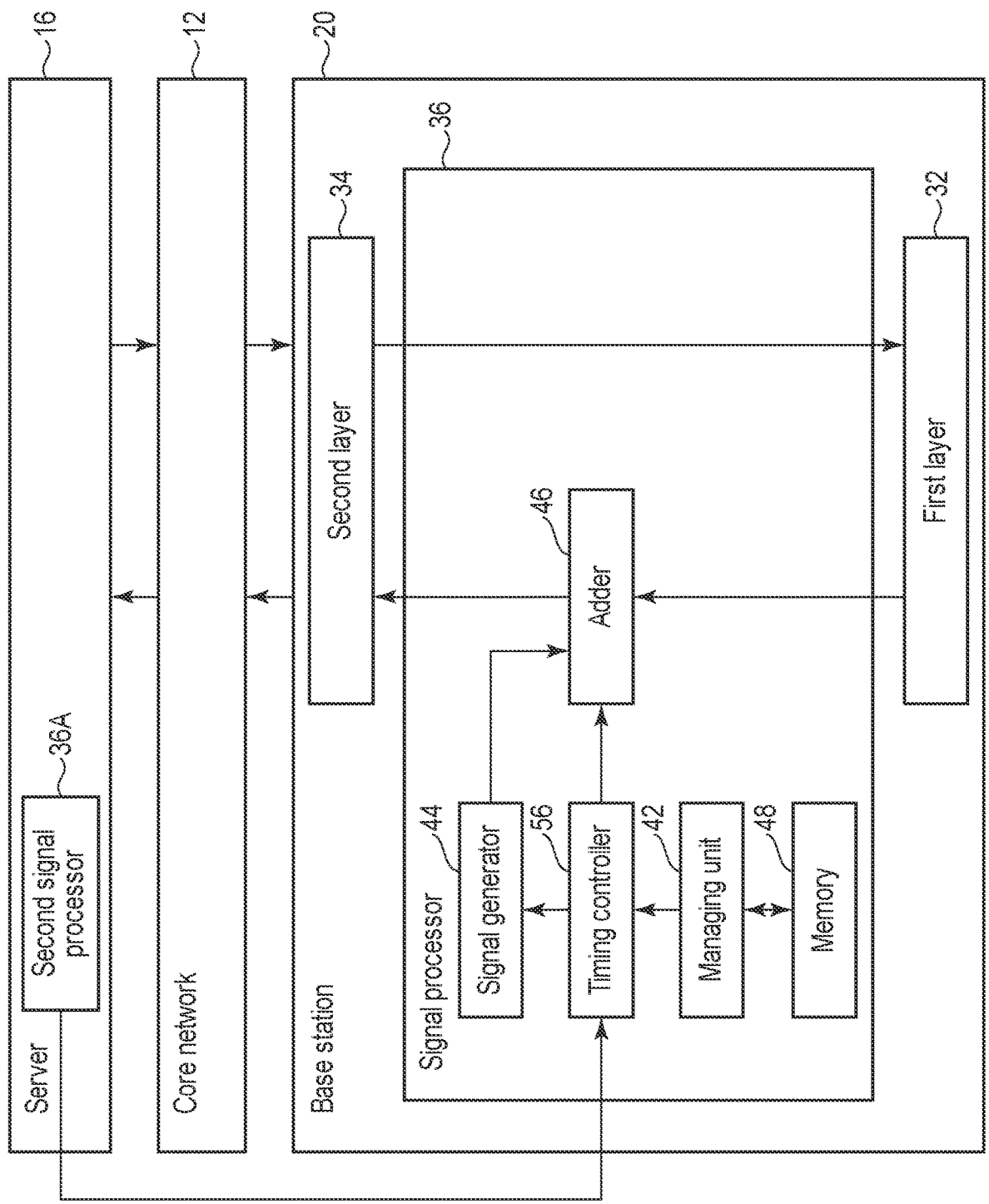
FIG. 18 is a diagram for describing an example of the base station according to a third modified example of the sixth embodiment.

FIG. 18 is a diagram for describing an example of the base station 20 according to a third modified example of the sixth embodiment. The second signal processor 36A is arranged in the server 16. The server 16 (the second signal processor 36A) estimates a timing at which uplink data is generated from information indicating various requests for uplink communication, such as a frequency of the uplink communication, a timing of the uplink communication, a communication amount of the uplink communication, and a level of delay reduction required for the uplink communication. The third modified example also achieves the same functions and effects as the sixth embodiment.

Seventh Embodiment

FIG. 19 is a block diagram for describing an example of a base station 20 according to a seventh embodiment. A signal processor 36 of the base station according to the seventh embodiment includes the acquiring unit 52 according to the second and third embodiments, the timing controller 56 according to the fourth and fifth embodiments, and the estimating unit 62 according to the sixth embodiment.

The memory 48 and the acquiring unit 52 are connected to the managing unit 42. The input unit 40 may be connected to the managing unit 42. At least one of the first physical layer signal transmitted from the first layer 32 to the adder 46 and the second physical layer signal transmitted from the second layer 34 to the first layer 32 is also transmitted to the acquiring unit 52. As illustrated in FIG. 12, the first allocation information from the second layer 34 may be transmitted to the acquiring unit 52.

The managing unit 42 transmits the first allocation information to the timing controller 56. The timing controller 56 selects some timings based on a signal from the estimating unit 62. The timing controller 56 transmits information indicating the some timings thus selected to the signal generator 44 and the adder 46.

At least one of the synthesis signal transmitted from the adder 46 to the second layer 34 and the second physical layer signal transmitted from the second layer 34 to the first layer 32 is also transmitted to the estimating unit 62. As illustrated in FIG. 14, a server 16 may transmit information indicating a timing at which the uplink data is generated to the timing controller 56.

As in the modified examples of the sixth embodiment, the second signal processor 36A corresponding to the estimating unit 62 may be arranged in the base station 20 but outside the signal processor 36, may be arranged outside the base station 20 as a device independent of the base station 20, or may be arranged in the server 16.

According to the seventh embodiment, functions and effects of all the above-described embodiments are achieved.

Eighth Embodiment

FIG. 20 is a block diagram for describing an example of a base station 20 according to an eighth embodiment. FIG. 20 illustrates an example of a case where O-RAN split option 7-2x proposed by the O-RAN is adopted. The base station 20 configures the RAN 10 and connects the terminal 24 and a core network (CN) 12. The RAN 10 includes a portion that processes a radio frequency (RF) signal and a portion that processes signals other than the radio frequency.

A portion that processes the radio frequency signal is referred to as a radio unit (RU). The RU performs processing of the RF layer and the low PHY layer. A portion that processes the signals other than the radio frequency includes a distributed unit (DU) and a centralized unit (CU). An interface between the RU and the DU is the Option 7-2. The DU includes the second layer 34. The DU executes processing of the high PHY layer, the low MAC layer, the high MAC layer, the low RLC layer, and the high RLC layer. The RU includes the first layer 32. The CU performs processing of the PDCP layer and the RRC layer.

The base station 20 is classified into a master base station 20-1 and slave base stations 20-3 and 20-4. The master base station 20-1 is connected to the core network 12 via a connection wire (back haul). The master base station 20-1 includes a CU 82 and a DU 84. The CU 82 executes a packet data convergence protocol, radio resource control, service data adaptation protocol, and the like. The DU 84 performs modulation/demodulation processing, encoding/decoding processing, scrambling processing, and the like.

The slave base stations 20-3 and 20-4 are connected to the master base station 20-1 via a network called a front haul. The slave base stations 20-3 and 20-4 are connected to the core network 12 via the master base station 20-1. The front haul may be a network using an optical fiber. Each of the slave base stations 20-3 and 20-4 includes an RU 86 and an antenna 88. The antenna 88 is a massive MIMO (multi input multi output) antenna including multiple antennas arranged in an array. The RU 86 performs AD/DA conversion, iFFT, analog (or digital) beamforming, and the like.

An arrangement example of a signal processor 36 in the base station divided into the master base station 20-1 and the slave base stations 20-3 and 20-4 will be described.

FIG. 21 is a block diagram for describing an example of a first arrangement of the signal processor 36. The signal processor 36 is arranged in the DU 84 of the master base station 20-1. The DU 84 includes the second layer 34 and the signal processor 36. The RU 86 includes the first layer 32.

Figure 22:
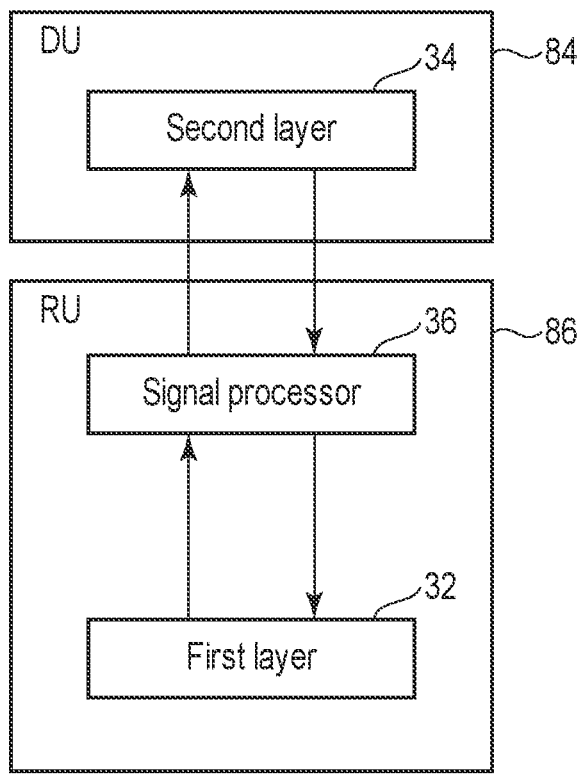
FIG. 22 is a block diagram for describing an example of a second arrangement of the signal processor.

FIG. 22 is a block diagram for describing an example of a second arrangement of the signal processor 36. The signal processor 36 is arranged in the RU 86 of the slave base station 20-3 or 20-4. The RU 86 includes the first layer 32 and the signal processor 36. The DU 84 includes the second layer 34.

According to the first or the second arrangement, it is possible to mount the signal processor 36 without increasing the number of devices and reduce a delay. The fact that the number of devices does not increase facilitates handling of the devices.

Figure 23:
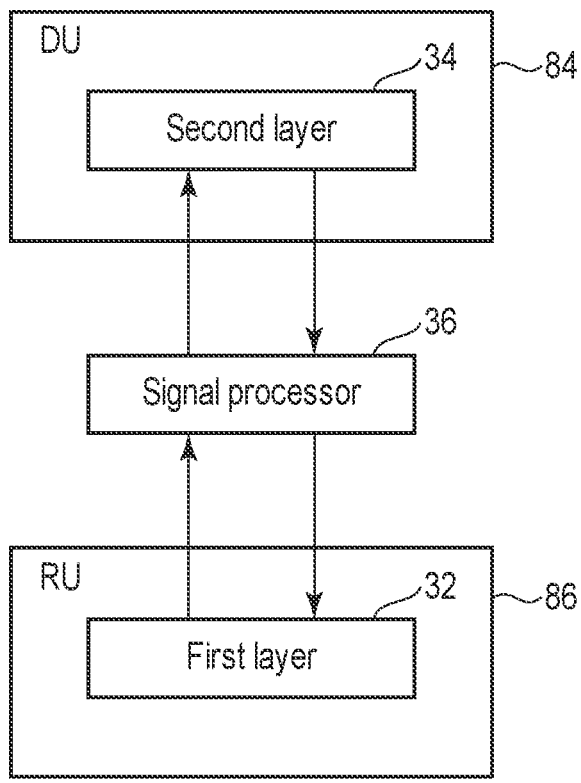
FIG. 23 is a block diagram for describing an example of a third arrangement of the signal processor.

FIG. 23 is a block diagram for describing an example of a third arrangement of the signal processor 36. The signal processor 36 is arranged outside the DU 84 of the master base station 20-1 and outside the RU 86 of the slave base station 20-3 or 20-4. The DU 84 includes the second layer 34. The RU 86 includes the first layer 32.

According to the third arrangement, the signal processor 36 can be mounted without changing both the DU 84 and the RU 86. A delay can be easily reduced.

According to the embodiments, following electronic apparatus, base station, communication system, method, and storage medium.

(1) An electronic apparatus arranged in a base station and at an interface between a first layer and a second layer, the electronic apparatus comprising:

a processor; and a memory configured to store allocation information indicating a radio resource with which a terminal is capable of transmitting a first control signal, wherein the first layer is configured to transmit a physical layer signal to the second layer, and the processor is configured to generate a second control signal based on the allocation information, generate a synthesis signal by adding the second control signal to the physical layer signal transmitted from the first layer based on the allocation information, and transmit the synthesis signal to the second layer.

(2) The electronic apparatus of (1), wherein the first control signal includes a scheduling request wherein the terminal requests the base station to allocate the radio resource; and the second control signal includes the scheduling request.

(3) The electronic apparatus of (1) or (2), wherein the base station comprises a physical layer configured to receive a signal transmitted from the terminal and demodulate a received signal;

the physical layer includes the first layer and the second layer; and the second layer is configured to convert the synthesis signal into a MAC layer signal.

(4) The electronic apparatus of one of (1) to (3), further comprising an input unit configured to input the allocation information.

(5) The electronic apparatus of one of (1) to (3), wherein the processor is configured to acquire the allocation information and write the allocation information into the memory.

(6) The electronic apparatus of (5), wherein the processor is configured to acquire the allocation information from at least one of the physical layer signal and a second physical layer signal transmitted from the second layer to the first layer.

(7) The electronic apparatus of (5), wherein the processor is configured to acquire the allocation information from the second layer.

(8) The electronic apparatus of one of (1) to (7), wherein the radio resource includes time;

the allocation information represents a plurality of timings; and the processor is configured to select a certain timing of the timings; and add the second control signal to the physical layer signal at the certain timing.

(9) The electronic apparatus of (8), wherein the processor is connected to a server configured to generate a selection signal for selecting a timing; and the processor is configured to select the certain timing based on the selection signal.

(10) The electronic apparatus of (8), wherein the processor is configured to select the certain timing based on an estimation result of a data transmission timing of the terminal.

(11) The electronic apparatus of (10), wherein the processor comprises an estimating unit configured to estimate the data transmission timing of the terminal based on at least one of the physical layer signal and a second physical layer signal transmitted from the second layer to the first layer.

(12) The electronic apparatus of (10), wherein the base station comprises an estimating unit configured to estimate the data transmission timing of the terminal based on at least one of the physical layer signal and a second physical layer signal transmitted from the second layer to the first layer; and the processor is configured to select the certain timing based on an estimation result of the estimating unit.

(13) The electronic apparatus of (10), wherein the base station is connected to an estimating unit configured to estimate the data transmission timing of the terminal based on at least one of the physical layer signal and a second physical layer signal transmitted from the second layer to the first layer; and the processor is configured to select the certain timing based on an estimation result of the estimating unit.

(14) The electronic apparatus of (10), wherein the processor is connected to a server;

the server comprises an estimating unit configured to estimate the data transmission timing of the terminal; and the processor is configured to select the certain timing based on an estimation result of the estimating unit.

(15) The electronic apparatus of one of (1) to (13), wherein the base station comprises a radio unit and a distributed unit;

the radio unit comprises an RF (radio frequency) layer and a low PHY (physical) layer;

the distributed unit comprises a high PHY layer, a low MAC (media access control) layer, a high MAC layer, a low RLC (radio link control) layer, and a high RLC layer; and the distributed unit comprises the processor and the second layer.

(16) The electronic apparatus of (1) to (13), wherein the base station comprises a radio unit and a distributed unit;

the radio unit comprises an RF (radio frequency) layer and a low PHY (physical) layer;

the distributed unit comprises a high PHY layer, a low MAC (media access control) layer, a high MAC layer, a low RLC (radio link control) layer, and a high RLC layer; and the radio unit comprises the processor and the first layer.

(17) The electronic apparatus of (1) to (13), wherein the base station comprises a radio unit and a distributed unit;

the radio unit comprises an RF (radio frequency) layer and a low PHY (physical) layer;

the distributed unit comprises a high PHY layer, a low MAC (media access control) layer, a high MAC layer, a low RLC (radio link control) layer, and a high RLC layer;

the distributed unit comprises the second layer;

the radio unit comprises the first layer; and the processor is connected between the radio unit and the distributed unit.

(18) A base station comprising:

the electronic apparatus of one of (1) to (17);

a wireless communication device configured to communicate with the terminal; and a communication device configured to communicate with a core network.

(19) A communication system comprising:

the electronic apparatus of one of (1) to (17);

a wireless communication device configured to communicate with the terminal;

a communication device configured to communicate with a core network; and a server connected to the core network.

(20) A method for an electronic apparatus comprising:
a processor arranged in a base station and at an interface between a first layer and a second layer; and
a memory configured to store allocation information indicating a radio resource with which a terminal is capable of transmitting a first control signal, the method comprising:
generating a second control signal based on the allocation information;
generating a synthesis signal by adding the second control signal to a physical layer signal transmitted from the first layer based on the allocation information; and
transmitting the synthesis signal to the second layer.

(21) A non-transitory computer-readable storage medium storing a program for an electronic apparatus comprising:
a computer arranged in a base station and at an interface between a first layer and a second layer; and
a memory configured to store allocation information indicating a radio resource with which a terminal is capable of transmitting a first control signal, the program, when executed, causing the computer to generate a second control signal based on the allocation information,
generate a synthesis signal by adding the second control signal to the physical layer signal transmitted from the first layer based on the allocation information, and
transmit the synthesis signal to the second layer.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus arranged in a base station and at an interface between a first layer and a second layer, the electronic apparatus comprising:
a first processor; and
a memory configured to store allocation information indicating a radio resource with which a terminal is capable of transmitting a first control signal,
wherein the first layer is configured to transmit a physical layer signal to the second layer, and
the first processor is configured to
generate a second control signal based on the allocation information,
generate a synthesis signal by adding the second control signal to the physical layer signal transmitted from the first layer based on the allocation information, and
transmit the synthesis signal to the second layer.

2. The electronic apparatus of claim 1, wherein
the first control signal includes a scheduling request wherein the terminal requests the base station to allocate the radio resource; and
the second control signal includes the scheduling request.

3. The electronic apparatus of claim 1, wherein
the base station comprises a physical layer configured to receive a signal transmitted from the terminal and demodulate a received signal;
the physical layer includes the first layer and the second layer; and
the second layer is configured to convert the synthesis signal into a MAC layer signal.

4. The electronic apparatus of claim 1, further comprising an input circuitry configured to input the allocation information.

5. The electronic apparatus of claim 1, wherein the first processor is configured to acquire the allocation information and write the allocation information into the memory.

6. The electronic apparatus of claim 5, wherein the first processor is configured to acquire the allocation information from at least one of the physical layer signal and a second physical layer signal transmitted from the second layer to the first layer.

7. The electronic apparatus of claim 5, wherein the first processor is configured to acquire the allocation information from the second layer.

8. The electronic apparatus of claim 1, wherein
the radio resource includes time;
the allocation information represents a plurality of timings; and
the first processor is configured to
select a certain timing of the timings; and
add the second control signal to the physical layer signal at the certain timing.

9. The electronic apparatus of claim 8, wherein
the first processor is connected to a server configured to generate a selection signal for selecting a timing; and
the first processor is configured to select the certain timing based on the selection signal.

10. The electronic apparatus of claim 8, wherein the first processor is configured to select the certain timing based on an estimation result of a data transmission timing of the terminal.

11. The electronic apparatus of claim 10, wherein the first processor is configured to estimate the data transmission timing of the terminal based on at least one of the physical layer signal and a second physical layer signal transmitted from the second layer to the first layer.

12. The electronic apparatus of claim 10, wherein
the base station comprises a second processor configured to estimate the data transmission timing of the terminal based on at least one of the physical layer signal and a second physical layer signal transmitted from the second layer to the first layer; and
the first processor is configured to select the certain timing based on an estimation result of the second processor.

13. The electronic apparatus of claim 10, wherein
the base station is connected to a second processor configured to estimate the data transmission timing of the terminal based on at least one of the physical layer signal and a second physical layer signal transmitted from the second layer to the first layer; and
the first processor is configured to select the certain timing based on an estimation result of the second processor.

14. The electronic apparatus of claim 10, wherein
the first processor is connected to a server;
the server comprises a second processor configured to estimate the data transmission timing of the terminal; and
the first processor is configured to select the certain timing based on an estimation result of the second processor.

15. The electronic apparatus of claim 1, wherein
the base station comprises a radio unit and a distributed unit;

the radio unit comprises an RF (radio frequency) layer and a low PHY (physical) layer;

the distributed unit comprises a high PHY layer, a low MAC (media access control) layer, a high MAC layer, a low RLC (radio link control) layer, and a high RLC layer; and the distributed unit comprises the first processor and the second layer.

16. The electronic apparatus of claim 1, wherein the base station comprises a radio unit and a distributed unit;

the radio unit comprises an RF (radio frequency) layer and a low PHY (physical) layer;

the distributed unit comprises a high PHY layer, a low MAC (media access control) layer, a high MAC layer, a low RLC (radio link control) layer, and a high RLC layer; and the radio unit comprises the first processor and the first layer.

17. The electronic apparatus of claim 1, wherein the base station comprises a radio unit and a distributed unit;

the radio unit comprises an RF (radio frequency) layer and a low PHY (physical) layer;

the distributed unit comprises a high PHY layer, a low MAC (media access control) layer, a high MAC layer, a low RLC (radio link control) layer, and a high RLC layer;

the distributed unit comprises the second layer;

the radio unit comprises the first layer; and the first processor is connected between the radio unit and the distributed unit.

18. A base station comprising:

the electronic apparatus according to claim 1;

a wireless communication device configured to communicate with the terminal; and a communication device configured to communicate with a core network.

19. A communication system comprising:

the electronic apparatus according to claim 1; and a core network connected to the electronic apparatus.

20. A method for a processing device comprising:

a processor arranged in a base station and at an interface between a first layer and a second layer; and a memory configured to store allocation information indicating a radio resource with which a terminal is capable of transmitting a first control signal, the method comprising:

generating a second control signal based on the allocation information;

generating a synthesis signal by adding the second control signal to a physical layer signal transmitted from the first layer based on the allocation information; and transmitting the synthesis signal to the second layer.

21. A non-transitory computer-readable storage medium storing a program for a processing device comprising:

a computer arranged in a base station and at an interface between a first layer and a second layer; and a memory configured to store allocation information indicating a radio resource with which a terminal is capable of transmitting a first control signal, the program, when executed, causing the computer to generate a second control signal based on the allocation information, generate a synthesis signal by adding the second control signal to the physical layer signal transmitted from the first layer based on the allocation information, and transmit the synthesis signal to the second layer.

* * * * *